(12) United States Patent
     Tsai et al.

(10) Patent No.: US 10,735,764 B2
(45) Date of Patent: Aug. 4, 2020

(54) PALETTE CODING FOR SCREEN CONTENT CODING

(71) Applicant: VID SCALE, INC., Wilmington, DE (US)

(72) Inventors: Chia-Ming Tsai, San Diego, CA (US); Yuwen He, San Diego, CA (US); Xiaoyu Xiu, San Diego, CA (US); Yan Ye, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/250,064

(22) Filed: Jan. 17, 2019

(65) Prior Publication Data

US 2019/0149843 A1    May 16, 2019

Related U.S. Application Data

(63) Continuation of application No. 14/658,989, filed on Mar. 16, 2015, now Pat. No. 10,237,575.
(Continued)

(51) Int. Cl.
*H04N 19/593*    (2014.01)
*H04N 19/93*    (2014.01)
(Continued)

(52) U.S. Cl.
CPC ......... *H04N 19/593* (2014.11); *H04N 19/186* (2014.11); *H04N 19/93* (2014.11); *H04N 19/94* (2014.11)

(58) Field of Classification Search
None
See application file for complete search history.

(56) References Cited

U.S. PATENT DOCUMENTS

| 2004/0156543 A1 | 8/2004 | Gardella et al. |
| 2005/0053151 A1* | 3/2005 | Lin ............ H04N 19/52 375/240.23 |

(Continued)

FOREIGN PATENT DOCUMENTS

| CN | 1917654 A | 2/2007 |
| EP | 1988703 A1 | 11/2008 |

(Continued)

OTHER PUBLICATIONS

Arnavut et al., "Lossless Compression of Color Palette Images with One-Dimensional Techniques", Journal of Electronic Imaging, vol. 15, No. 2, Apr.-Jun. 2006, 11 pages.

(Continued)

*Primary Examiner* — Rebecca A Volentine
(74) *Attorney, Agent, or Firm* — Condo Roccia Koptiw LLP

(57) ABSTRACT

Video data may be palette decoded. Data defining a palette table may be received. The palette table may comprise index values corresponding to respective colors. Palette index prediction data may be received and may comprise data indicating index values for at least a portion of a palette index map mapping pixels of the video data to color indices in the palette table. The palette index prediction data may comprise run value data associating run values with index values for at least a portion of a palette index map. A run value may be associated with an escape color index. The palette index map may be generated from the palette index prediction data at least in part by determining whether to adjust an index value of the palette index prediction data based on a last index value. The video data may be reconstructed in accordance with the palette index map.

20 Claims, 19 Drawing Sheets

Related U.S. Application Data

(60) Provisional application No. 62/041,043, filed on Aug. 23, 2014, provisional application No. 61/953,700, filed on Mar. 14, 2014.

(51) Int. Cl.
  *H04N 19/94* (2014.01)
  *H04N 19/186* (2014.01)

(56) References Cited

U.S. PATENT DOCUMENTS

| | | |
|---|---|---|
| 2006/0071829 A1 | 4/2006 | Pearlstein et al. |
| 2006/0204086 A1 | 9/2006 | Gargi |
| 2008/0062480 A1 | 3/2008 | Iizuka et al. |
| 2008/0273804 A1 | 11/2008 | Malewski |
| 2010/0158400 A1 | 6/2010 | Lu et al. |
| 2014/0241630 A1* | 8/2014 | MacInnis ............ H04N 19/593 382/166 |
| 2014/0301474 A1 | 10/2014 | Guo et al. |
| 2015/0016501 A1 | 1/2015 | Guo et al. |
| 2015/0030066 A1 | 1/2015 | Xu et al. |
| 2016/0100178 A1 | 4/2016 | Lin et al. |
| 2016/0309172 A1 | 10/2016 | Laroche et al. |
| 2016/0309177 A1* | 10/2016 | Laroche ............... H04N 19/105 |
| 2016/0316199 A1 | 10/2016 | Chuang et al. |
| 2016/0330452 A1 | 11/2016 | Laroche et al. |
| 2017/0238001 A1 | 8/2017 | Li et al. |

FOREIGN PATENT DOCUMENTS

| | | | |
|---|---|---|---|
| WO | WO 2015/006724 A2 | 1/2015 | |
| WO | WO 2015/086717 A2 | 6/2015 | |
| WO | WO 2015/086718 A2 | 6/2015 | |
| WO | 2015/103390 A1 | 7/2015 | |
| WO | 2015/179803 A1 | 11/2015 | |

OTHER PUBLICATIONS

Ausbeck, Paul J., "The Piecewise-Constant Image Model", Proceedings of the IEEE, vol. 88, No. 11, Nov. 2000, pp. 1779-1789.

Bross et al., "High Efficiency Video Coding (HEVC) Text Specification Draft 10 (for FDIS & Consent)", JCTVC-L1003, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 321 pages.

Burrows et al., "A Block-Sorting Lossless Data Compression Algorithm", SRC Research Report, May 10, 1994, 24 pages.

Guo et al., "Evaluation of Palette Mode Coding on HM-12.0+RExt-4.1", Qualcomm Incorporated, JCTVC-O0218, Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013, 6 pages.

Guo et al., "Non-RCE3: Modified Palette Mode for Screen Content Coding", Qualcomm Incorporated, JCTVC-N0249, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 6 pages.

Guo, et al., "AHG8: Major-Color-Based Screen Content Coding", JCTVC-O0182, Microsoft Corp., Joint Collaborative Team on Video Coding (JCT-VC) of ITU-T SG 16 WP 3 and ISO/IEC JTC 1/SC 29/WG 11, 15th Meeting: Geneva, CH, Oct. 23-Nov. 1, 2013, 10 pages.

ISO/IEC, "Joint Call for Proposals for Coding of Screen Content", ITU-T Q6/16 Visual Coding and ISO/IEC JTC1/SC29/WG11 Coding of Moving Pictures and Audio, ISO/IEC JTC1/SC29/WG11 MPEG2014/N14175, Jan. 2014, 16 pages.

Ke et al., "Non-RCE4: Advanced Copy Mode for Palette Coding", Industrial Technology Research Institute, JCTVC-P0090, Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, 5 pages.

Kobayashi et al., "Lossless Compression for Compound Color Document Images", IDW, HCS2-2, Jan. 1, 2001, pp. 1525-1528.

Lin et al., "AHG8: P2M Based Dual-Coder Extension of HEVC", Tongji University, JCTVC-L0303, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-5.

Pan et al., "A Low-Complexity Screen Compression Scheme for Interactive Screen Sharing", IEEE Transactions Circuits and Systems for Video Technology, vol. 23, No. 6, Jun. 2013, pp. 949-960.

Pang et al., "Non-RCE3: 2-D MV Supported Intra Motion Compensation", Qualcomm Inc., JCTVC-N0256, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, 5 pages.

Sole et al., "AhG8: Requirements for Wireless Display Applications", Qualcomm, JCTVC-M0315, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 2 pages.

Sullivan et al., "Rate-Distortion Optimization for Video Compression", Signal Processing Magazine, IEEE, vol. 15, No. 6, Nov. 1998, pp. 74-90.

Vermeir, Thijs, "Use Cases and Requirements for Lossless and Screen Content Coding", JCTVC-M0172, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, 6 pages.

Xiu et al., "Description of Screen Content Coding Technology Proposal by Inter Digital", InterDigital Communications, LLC, JCTVC-Q0037, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, 30 pages.

Zhu et al., "AHG10: Modified Copy Above Mode for Palette Based Coding", JCTVC-Q0174, Mar. 27-Apr. 4, 2014, pp. 1-3.

Zhu et al., "Non-SCCE3: Modified Escaped Pixel Mode in Palette Based Coding", JCTVC-R0080, Jun. 30-Jul. 9, 2014, pp. 1-4.

Guo et al., "RCE4: Test 1. Major-Color-Based Screen Content Coding", JCTVC-P0108, Microsoft Corp., Joint Collaborative Team on Video Coding (JCT-VC) of ITU-T SG 16 WP 3 and ISO/IEC JTC 1/SC 29/WG 11, 16th Meeting: San Jose, US, Jan. 9-17, 2014, pp. 1-13.

* cited by examiner

PALETTE CODING FOR SCREEN CONTENT CODING

CROSS-REFERENCE TO RELATED APPLICATIONS

This application is a continuation of U.S. patent application Ser. No. 14/658,989, filed Mar. 16, 2015, which is the Nation Stage entry under 35 U.S.C. § 371 of Patent Cooperation Treaty Application No. PCT/US2015/020765, filed Mar. 15, 2015, which claims the benefit of U.S. Provisional Patent Application No. 61/953,700, filed Mar. 14, 2014, and U.S. Provisional Patent Application No. 62/041,043, filed Aug. 23, 2014, the disclosures of which are incorporated herein by reference in their entirety.

BACKGROUND

Screen content sharing applications have become very popular in recent years with the increased popularity of remote desktop, video conferencing, and mobile media presentation applications. There may be application requirements from industries. Screen content may refer to video that may not be part of a natural video scene. Screen content may include, for example, outlines (e.g., to visually separate two separate pictures shown simultaneously on a monitor), words, line drawings, etc. Screen content may include numerous blocks with a few major colors and sharp edges due to a prevalence of sharp curves, text, and the like in the video content.

Video compression methods may be used to encode screen content. Many existing compression methods do not fully characterize the features of screen content, which may lead to inefficient compression performance. Furthermore, the reconstructed picture at the receiver may have quality issues. For example, the curves and texts may be blurred and difficult to recognize.

Video compression methods that are efficient for screen content coding are becoming increasingly important because more and more people are sharing their device content for media presentations and remote desktop purposes. Furthermore, screen display resolution of mobile devices has substantially increased to high definition or ultra-high definition resolutions. Video coding tools, such as block coding modes and transform, may not be optimized for screen content encoding and may increase the bandwidth consumption for transmitting screen content.

SUMMARY

Methods, systems, and instrumentalities are disclosed for palette decoding video data, e.g., screen content video data. Data defining a palette table may be received. The palette table may comprise a plurality of index values corresponding to respective colors of a plurality of colors. Palette index prediction data may be received. The palette index prediction data may comprise data that may indicate index values for at least a portion of a palette index map that may map one or more pixels of the video data to one or more color indices in the palette table. The palette index map may be generated from the palette index prediction data at least in part by determining whether to adjust an index value of the palette index prediction data based on a last index value. The video data may be reconstructed in accordance with the palette index map.

Video data may be palette coded by producing a palette table comprising a plurality of color indices corresponding to respective colors of a plurality of colors. A palette index map may be created. The palette index map may map one or more pixels of the video data to one or more color indices in the palette table. Palette index prediction data may be generated based on the palette index map. The palette index prediction data may comprise data that may indicate index values for at least a portion of the palette index map. Generating the palette index prediction data may include determining whether to adjust an index value of the palette index map based on a last index value.

Data defining a palette table may be received. The palette table may comprise a plurality of color index values corresponding to respective colors of a plurality of major colors. A palette index prediction data may be received. The palette index prediction data may comprise run value data that may associate run values with index values for at least a portion of a palette index map. At least one run value may be associated with an escape color index. At least a portion of the video data may be reconstructed in accordance with the palette table, the palette index prediction data, and the palette index map.

Video data may be palette coded by producing a palette table that may comprise a plurality of color indices corresponding to respective colors of a plurality of major colors. A palette index map may be created. The palette index map may map a pixel of the video data to a color index in the palette table if a color of the pixel is associated with a major color. The palette index map may map the pixel of the video data to an escape color index if the color of the pixel is not associated with a major color. Palette index prediction data may be generated based on the palette index map. The palette index prediction data may comprise run value data that associates run values to index values for at least a portion of the palette index map. At least one run value of the run value data may be associated with the escape color index.

Video data may be palette decoded, for example, by receiving in a video bitstream a palette table. The palette table may comprise a plurality of indices that may represent palette colors of a plurality of colors. Palette index map parameters may be received in the video bitstream. The palette index map parameters may represent a series of indices. One or more indices, e.g., each index, of the series of indices may map one or more pixels of a coding unit of the video data to either a palette color of the palette table or to an escape color mode. Based on the palette index map parameters, the pixels of the coding unit that may be mapped by the palette index map to the escape color mode may be determined. After receiving the set of index map parameters for the coding unit, a decoder may receive escape color parameters that may indicate the escape color values for each of the pixels of the coding unit mapped to the escape color mode. The colors for the pixels of the coding unit may be reconstructed based on the received palette index map parameters and the received escape color parameters.

Video data may be palette coded by producing a palette table that may comprise a plurality of indices that may represent palette colors of a plurality of colors. A palette index map may be created for a coding unit of the video data. The palette index map may comprise a series of indices. One or more indices, e.g., each index, of the series may be taken either from the plurality of indices in the palette table or from an index indicative of an escape color mode. The series of indices may selectively map pixels of the coding unit to the palette colors or to the escape color mode. The palette table and palette index map parameters may be transmitted in a video bitstream. The palette index map parameters may represent the series of indices of the palette index map for the coding unit. After the palette index map parameters are transmitted, additional parameters may be transmitted in the video bitstream. These additional parameters may indicate the escape color values for the pixels of the coding unit mapped to the escape color mode.

BRIEF DESCRIPTION OF THE DRAWINGS

A more detailed understanding may be had from the following description, given by way of example in conjunction with the accompanying drawings wherein.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1:
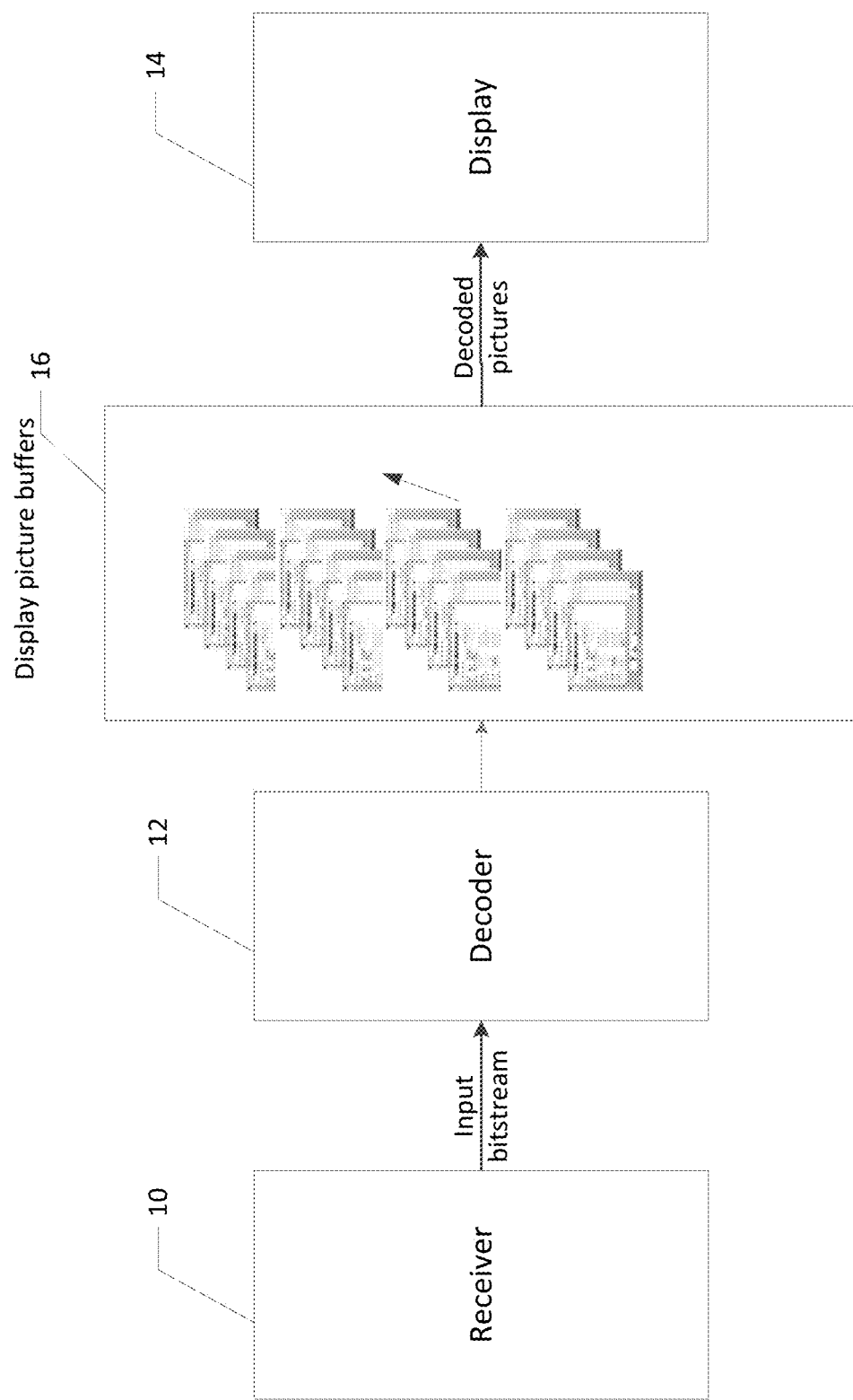
FIG. 1 is a block diagram of a screen content sharing system.

FIG. 1 is a block diagram illustrating an example screen content sharing system. The screen content sharing system may include a receiver 10, a decoder 12, and a display (e.g., a renderer) 14. The receiver 10 may receive video signals and may demodulate them for forwarding to the decoder 12, which may decode the video stream and may generate a plurality of separate pictures stored in multiple picture buffers 16 that may be output to the display 14.

Figure 2:
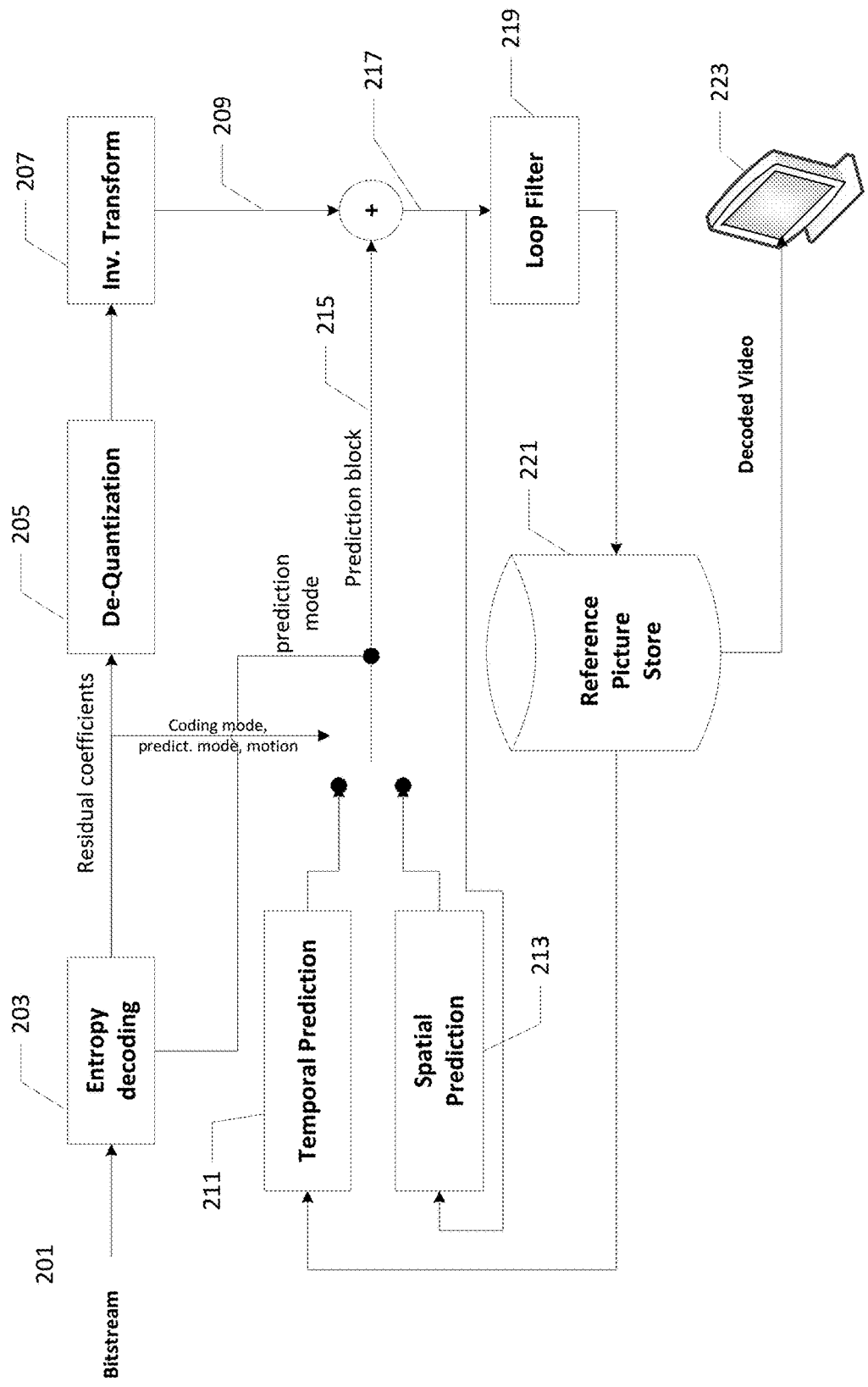
FIG. 2 is a block diagram of a video decoder.

FIG. 2 is a block diagram illustrating an example block-based single layer decoder that may be used as decoder 12 in FIG. 1. It may receive a video bitstream 201 produced by an encoder and may reconstruct the video signal to be displayed. At the video decoder, the bitstream 201 may be parsed by an entropy decoder 203. The residual coefficients may be inverse quantized in a de-quantizer logical block 205 and may be inverse transformed in an inverse transform logical block 207 to obtain a reconstructed residual signal 209. The coding mode and prediction information may be used to obtain a prediction signal 215 using spatial prediction (e.g., a spatial prediction logical block 211) and/or temporal prediction (e.g., a temporal prediction logical block 213). The prediction signal 215 and the reconstructed residual signal 209 may be added together to obtain a reconstructed video signal 217. The reconstructed video signal may additionally go through loop filtering (e.g., a loop filter logical block 219) before being stored in a reference picture store 221 to be displayed on a monitor 223 and/or used to decode a future video signal.

Figure 3:
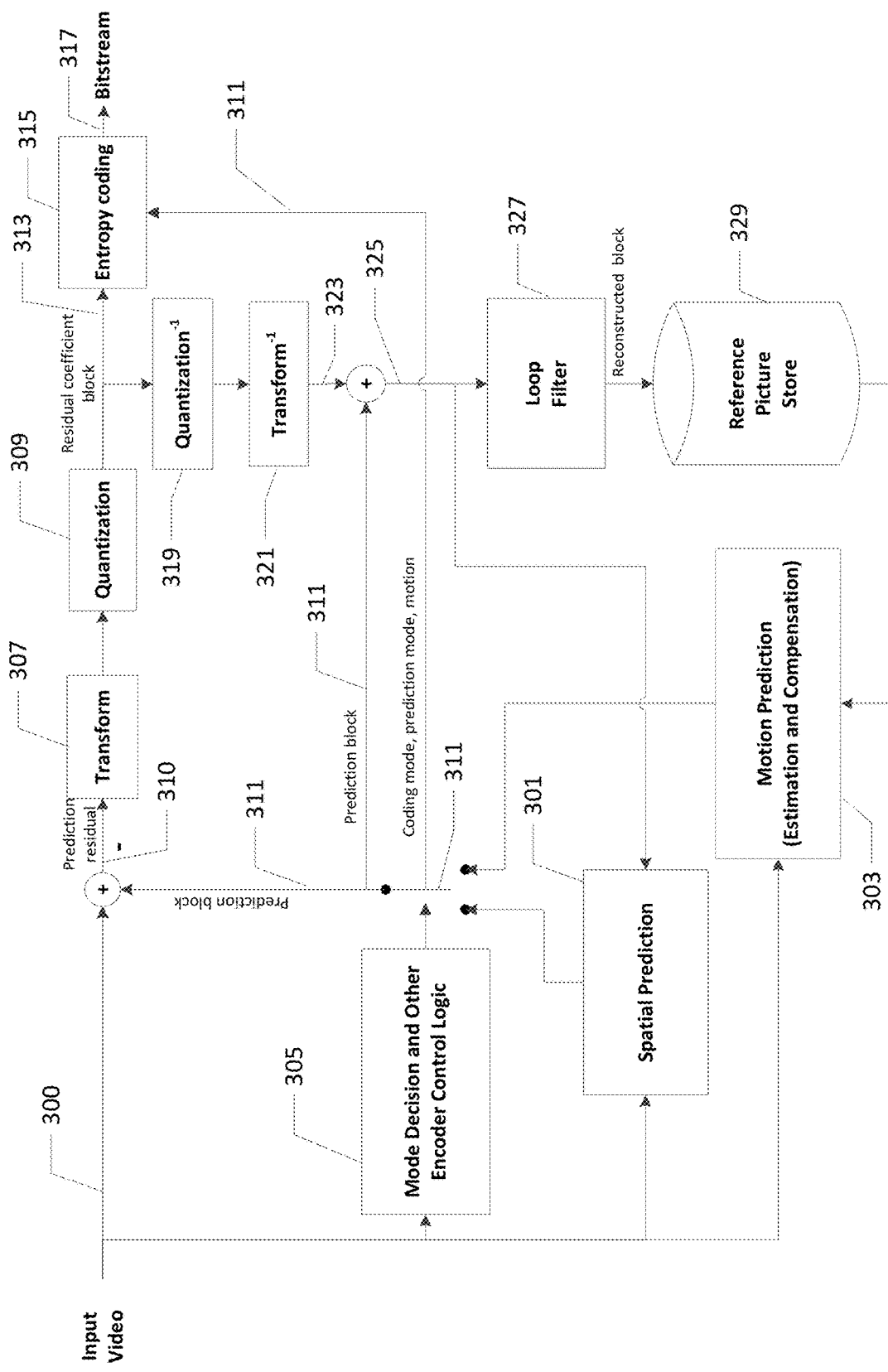
FIG. 3 is a block diagram of a video encoder.

FIG. 3 is a block diagram illustrating an example block-based single layer video encoder that may be used to generate the encoded video data received at the screen content sharing system of FIG. 1. As shown in FIG. 3, to achieve efficient compression, a single layer encoder may employ, for example, spatial prediction (e.g., intra prediction) at a block 301 and/or temporal prediction (e.g., inter prediction and/or motion compensated prediction) at a block 303 to predict an input video signal 300. The encoder may also have mode decision logic 305 that may choose a suitable form (e.g., the most suitable form) of prediction, for example, based on certain criteria such as a combination of rate and distortion considerations. The encoder may then transforms at a block 307 and/or quantize at a block 309 a prediction residual 310 (e.g., the difference signal between the input signal 300 and a prediction signal 311). A quantized residual 313, together with the mode information (e.g., intra or inter prediction) and the prediction information 311 (e.g., motion vectors, reference picture indices, intra prediction modes, etc.) may be further compressed at an entropy coder 315 and packed into an output video bitstream 317. As shown in FIG. 3, the encoder may generate a reconstructed video signal 325 by applying inverse quantization at a block 319 and/or inverse transformation at a block 321 to the quantized residual to obtain a reconstructed residual 323, and adding it back to the prediction signal 311. The reconstructed video signal 325 may additionally go through a loop filter 327 (for example, deblocking filter, Sample Adaptive Offsets, and/or Adaptive Loop Filters), and may be stored in a reference picture store 329 to be used to predict future video signals.

Figure 4:
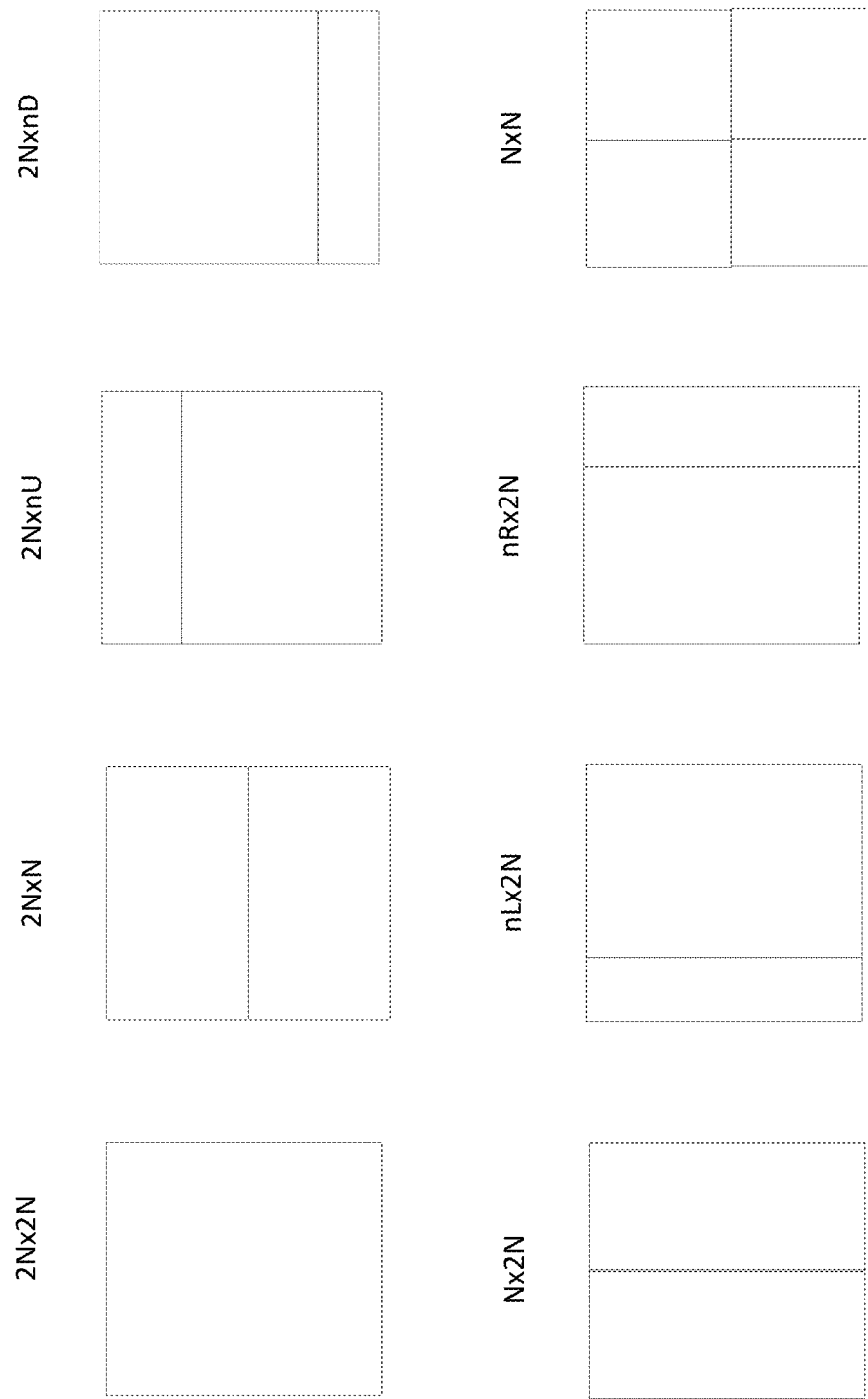
FIG. 4 illustrates eight prediction unit modes in HEVC.

MPEG has been working on video coding standards to save transmission bandwidth and storage. High Efficiency Video Coding (HEVC) is an emerging video compression standard jointly developed by the ITU-T Video Coding Experts Group (VCEG) and ISO/IEC Moving Picture Experts Group (MPEG). HEVC may be a block-based hybrid video coding standard in that its encoder and decoder may operate according to FIGS. 2 and 3. HEVC may allow the use of larger video blocks compared to other standards, and may use quadtree partition to signal block coding information. The picture or slice may be partitioned into coding tree blocks (CTBs) with the same size (e.g., 64×64). A CTB may be partitioned into coding units (CUs) with quadtree, and a CU may be partitioned further into prediction units (PU) using some patterns and transform units (TU), also using quadtree. For each inter coded CU, its PU may have one of eight partition modes, as shown in FIG. 4. Temporal prediction, e.g., motion compensation, may be applied to reconstruct the inter coded PUs. Depending on the precision of the motion vectors, which may be up to quarter pixel in HEVC, linear filters may be applied to obtain pixel values at fractional positions. In HEVC, the interpolation filters may have, for example, seven or eight taps for luma and four taps for chroma. The deblocking filter in HEVC may be content-based. Different deblocking filter operations may be applied at the TU and PU boundaries, depending on a number of factors, such as coding mode difference, motion difference, reference picture difference, pixel value difference, etc. For entropy coding, HEVC may adopt context-based adaptive arithmetic binary coding (CABAC) for most block level syntax elements. CABAC coding may use context-based coded regular bins and/or bypass coded bins without context.

Screen content material, such as text and graphics, may show different characteristics than natural video content. Coding tools may improve the coding efficiency of screen content coding, e.g., based on palette coding and/or intra block copy.

Figure 5B:
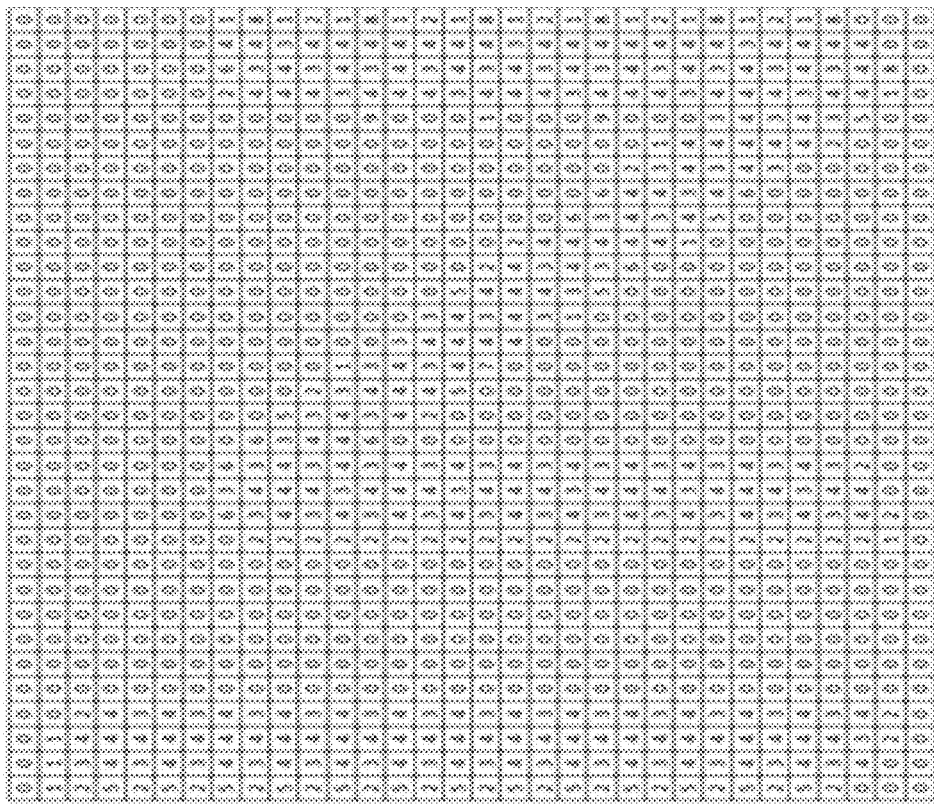
FIG. 5B shows a palette index map of the piece of screen content of FIG. 5A.
Figure 5A:
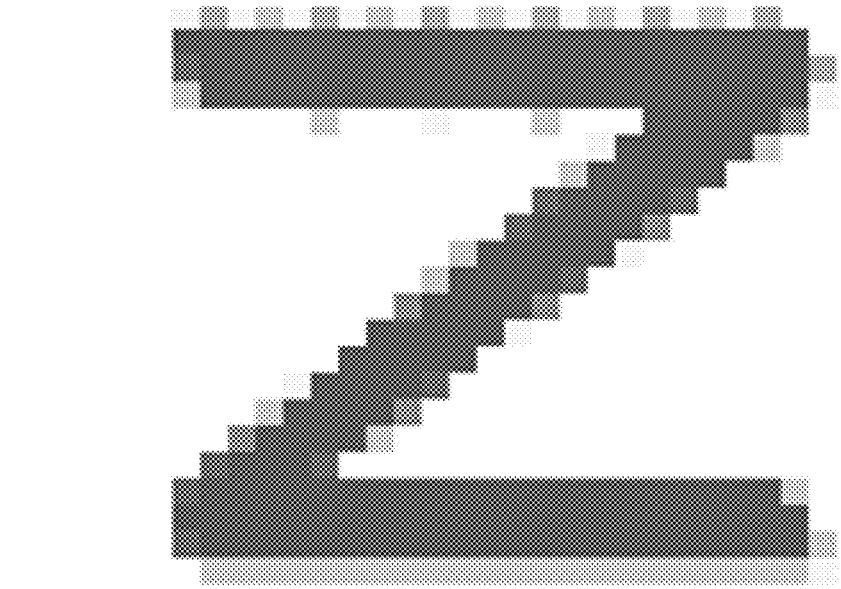
FIG. 5A illustrates an exemplary piece of screen content in the form of a word.
Figure 5A:

As shown in FIG. 5A, screen content blocks may include a limited number of colors, and the color value of a pixel may be repeated from an adjacent (e.g., above or left or right) pixel. A palette table may be used as a dictionary to record the significant pixel values and the corresponding palette index map may be used to represent the color values of the corresponding pixels, as shown in FIG. 5B. To reduce the spatial redundancy, "run" values may be used to indicate the length of consecutive pixels that have the same palette index value, e.g., color index. Using a palette-based coding method may improve the compression performance for coding screen content.

Figure 7A:
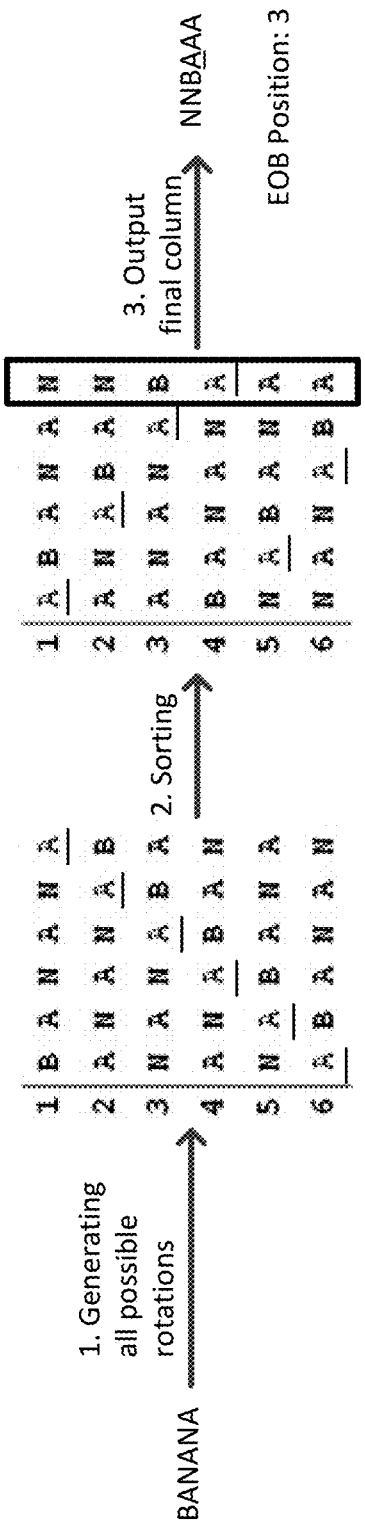
FIG. 7A illustrates an example of BWT encoding.
Figure 7B:
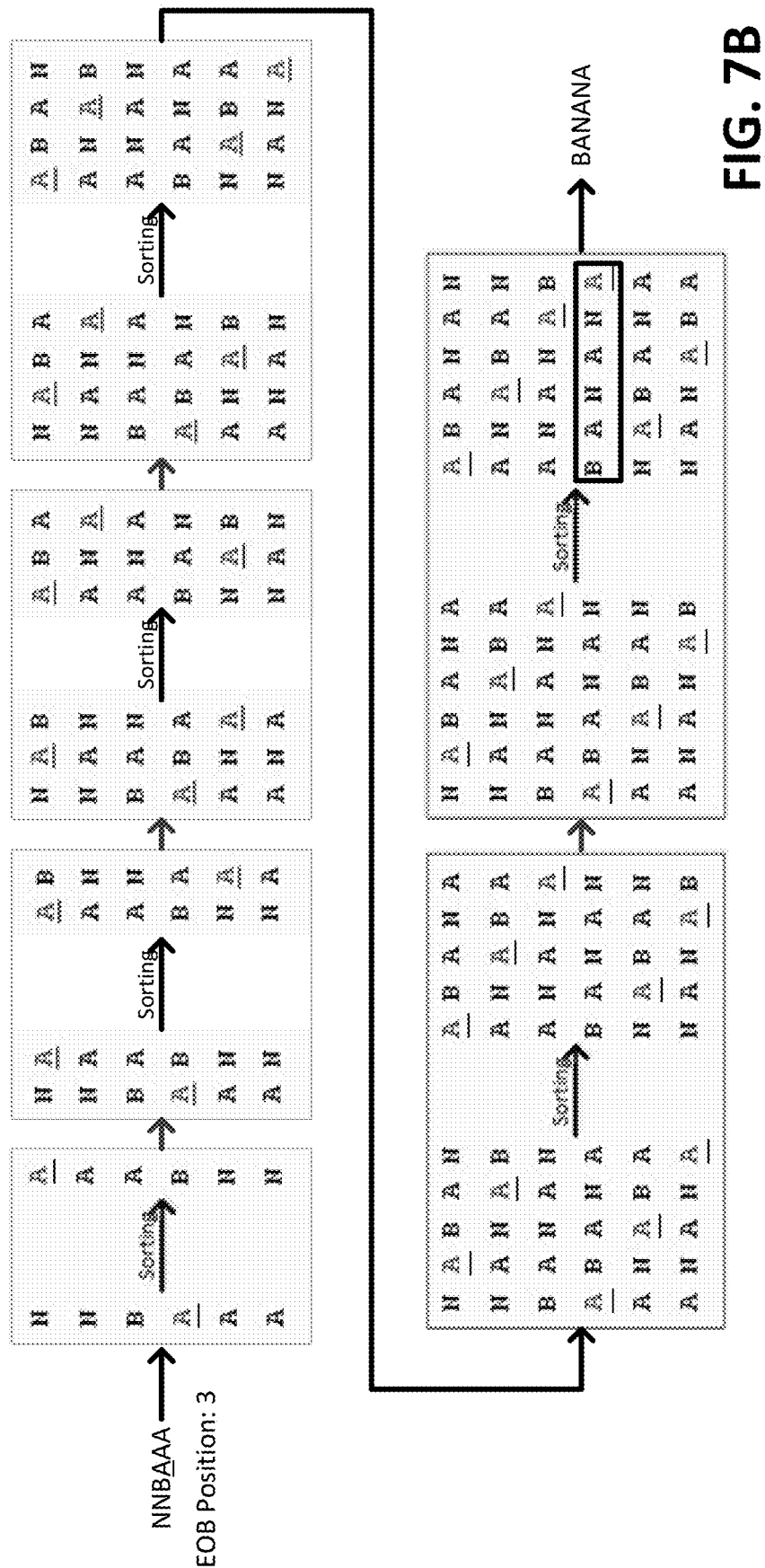
FIG. 7B illustrates an example of BWT decoding.

A Burrows-Wheeler Transform (BWT) may be used in lossless data compression. BWT may rearrange an input character string into multiple runs of elements with the same character. To output the rearranged string, a table may be created to store the possible rotations of the input string. The rotated strings may be sorted. A column (e.g., the final column) of the sorted data may be extracted as the output string. Beside the output string, the end of the block position may be transmitted to facilitate reconstruction at the decoder side. An example of BWT is shown in FIG. 7A. The source is "BANANA", and the output of BWT is "NNBAAA". Decoding may involve appending the transformed string to a decoding table. The decoding table may be sorted. Appending the transformed string to the decoding table and sorting the decoding table may be performed for k rounds, where k may be the string length. For the last round, the string with the end of block position at the end may be the original string. For example, in FIG. 7B, the transformed string "NNBAAA" may be appended to the decoding table. After sorting, the first column of the decoding table may become "AAABNN." At the second round, the string "NNBAAA" may be appended to the decoding table again, and the table may be sorted again. After six rounds (e.g., the length of the string), the fourth row of the decoding table which with the end of block position "A" may be the original string. In entropy coding, three characters may be signaled, e.g., "N," "B," and "A," with three corresponding run values, e.g., 1, 0, and 2, respectively. The rearranged string may be more compression-friendly than the original input string. The BWT coding method may be suitable to be applied in improving the efficiency of palette index map coding.

The performance of components of palette coding, including BWT-based palette index map reordering, escape color signaling, palette index prediction, and palette index map coding may be provided. The coding techniques may be applied to HEVC coding or other video codecs.

Some video coding standards may not fully optimize the compression performance of screen content coding. For example, some general purpose encoders may be optimized for natural video sequences. Screen content may include many more sharp edges with discrete color distribution and discontinuous tone than natural video sequences. After applying some mode decision and transform-based coding processes, some residual values may be located in high frequency areas such that a residual scan method may be inefficient for the entropy coding process that may follow. A palette-based coding method may improve the coding performance of screen content blocks by forming a palette by selecting the commonly appearing colors in the block that is encoded from a color histogram and converting a CU pixel to a palette index by searching for the most similar element in the palette table. A run value may be used to indicate a number of consecutive pixel positions that share the same palette index and may reduce the overhead of representing palette indices. A prediction mode, e.g., a run mode or a copy mode, may be used to indicate whether the palette index of the current pixel is predicted from the palette index of the pixel to the left/right of the current pixel position in horizontal raster scan order or predicted from the pixel positioned above the current pixel position.

A CU pixel may be clustered into major colors and escape colors to form the palette table. A line mode may be used to encode the palette index. Palette-based coding methods may show significant coding gain. The palette index map may be scanned in the horizontal raster scan order. The discontinuousness issue may occur when scanning to the next line; this may cause more coding bits to be used in signaling the palette coding mode. Further, geometric correlation between adjacent positions in the palette index map may be exploited using run and copy mode prediction.

Palette index map reordering may use BWT coding. The reordered index map may be compression-friendly and may improve the efficiency of palette index map coding.

The escape color may be assigned to a fixed palette map index, such that the identification of escape color may be realized through palette index signaling.

The index value of an escape color may be set to the palette table size. This may prevent signaling additional flags to indicate an escape color position.

A copy-left mode and/or a transition palette mode may be used to utilize the geometric index value relations and may reduce the overhead in signaling palette index value.

Palette index map coding may effectively encode the major components of a palette index map, e.g., mode, run value, index value, and escape color value.

Palette coding for screen content coding may involve BWT-based palette index map reordering, escape color signaling, palette index prediction, and/or palette index map coding.

Figure 6:
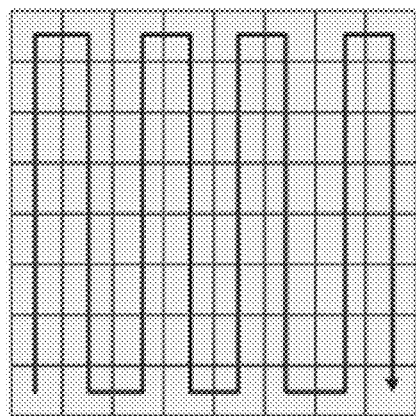
FIG. 6 illustrates a number of example scan orders.
Figure 6:
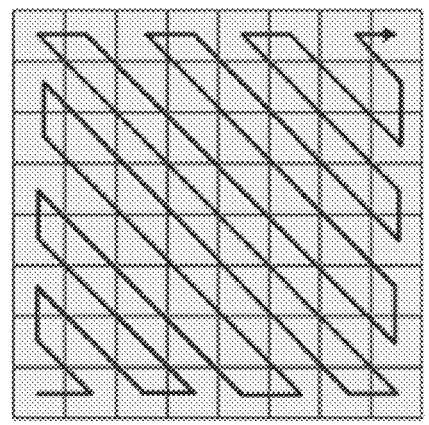
Figure 6:
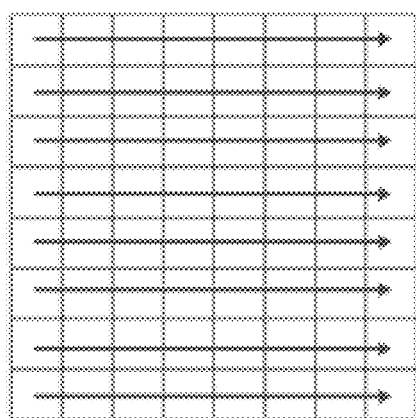
Figure 6:
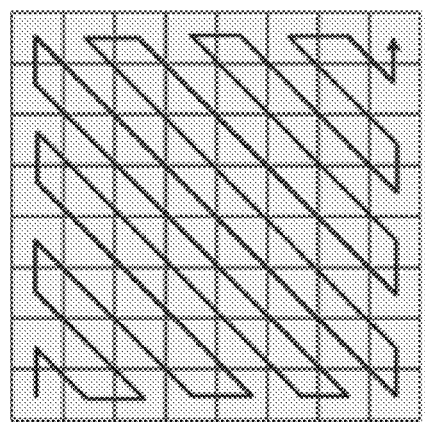
Figure 6:
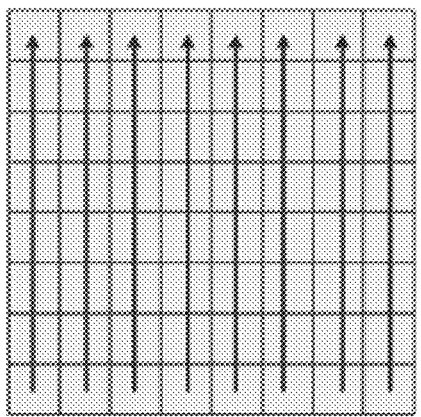
Figure 6:
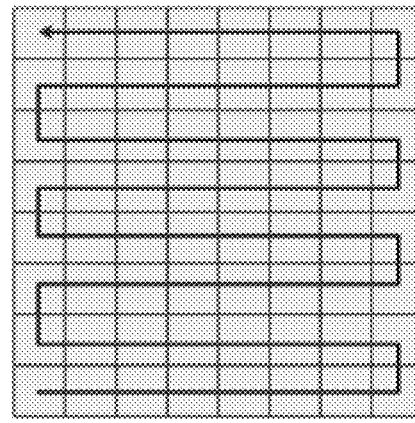

The BWT may group the same elements together. The BWT may be used to increase the correlation between adjacent positions in the palette index map. The BWT may be applied before encoding the palette index map. Before applying the BWT, for the palette index scan order, a position may be predicted in the vertical or horizontal raster scan order, as shown at examples (a) and (b), respectively, in FIG. 6. The vertical or horizontal raster scan order may exhibit the discontinuousness issue; e.g., the index value of the first position of a row may have a high probability of being different from the last position of the previous row. This may cause the BWT to be inefficient and may increase the number of symbols used for encoding. To mitigate the discontinuousness issue, a transverse scan order (e.g., as shown at examples (c) and (d) in FIG. 6) or a zig-zag scan order (e.g., as shown at examples (e) and (f) in FIG. 6) may be used. This scanning method may keep the similarity of adjacent positions along the scan order path.

After positions are scanned as a one-dimensional index sequence, the sequence may be fed into the BWT process and the end position as BWT side information (e.g., overhead) may be coded for decoder side reconstruction. The side information of BWT may be an overhead for BWT-based coding, which may cause no coding gain or loss for some blocks. A one-bit flag may be used to indicate whether BWT is performed or not. The flag may be signaled at a sequence level, at a picture or slice level, or CU level, for example, depending on the application. The complexity of BWT may be related to sorting, and storing the encoding/decoding table may use considerable memory space. The data structure for BWT input may be a ring buffer. For an m×m block, it may create m×m pointers to point to the block positions, and sorting may be performed between these pointers. This may reduce the memory space used by the encoding/decoding table.

To identify pixels that may not have a corresponding entry in the palette table, pixels may be classified as escape color pixels. The color classification may be represented as in Equations (1) and (2), in which error(C, PLT) may be the minimum error between the color C and the most similar color PLT in the palette table. If error(C, PLT) is less than the threshold ERROR_LIMIT, the color C may be a major color. If error(C, PLT) is not less than the threshold ERROR_LIMIT, the color C may be an escape color. The error function may be measured by the mean square error between the color C and the $i^{th}$ palette entry $P_i$.

$$\text{Type}(C) = \begin{cases} Major_{Color}, & \text{error}(C, PLT) < \text{ERROR\_LIMIT} \\ Escap_{Color}, & \text{error}(C, PLT) \geq \text{ERROR\_LIMIT} \end{cases} \quad (1)$$

$$\text{error}(C, PLT) = \min_i (dist(C, P_i)) \quad (2)$$

Escape colors may be signaled using palette indices that are not used to signal non-escape colors, e.g., major colors. Signaling escape colors in this way may avoid the signaling overhead associated with using a dedicated flag bit or flag bits to signal an escape color. For example, to identify the location of these escape color pixels without the use of additional flag bits to signal an escape color, the palette index of the escape color may be set to the maximum palette index value plus 1. For example, if the maximum palette index value is 30, the palette index of the escape color may be set to 31.

Palette index prediction may utilize the geometrical relations between pixels. Palette index prediction may employ a copy-left mode and/or a transition mode. A pixel may be copied from a previously reconstructed pixel located above it. In a run mode, a pixel may be copied from its immediate left neighbor.

Figure 8:
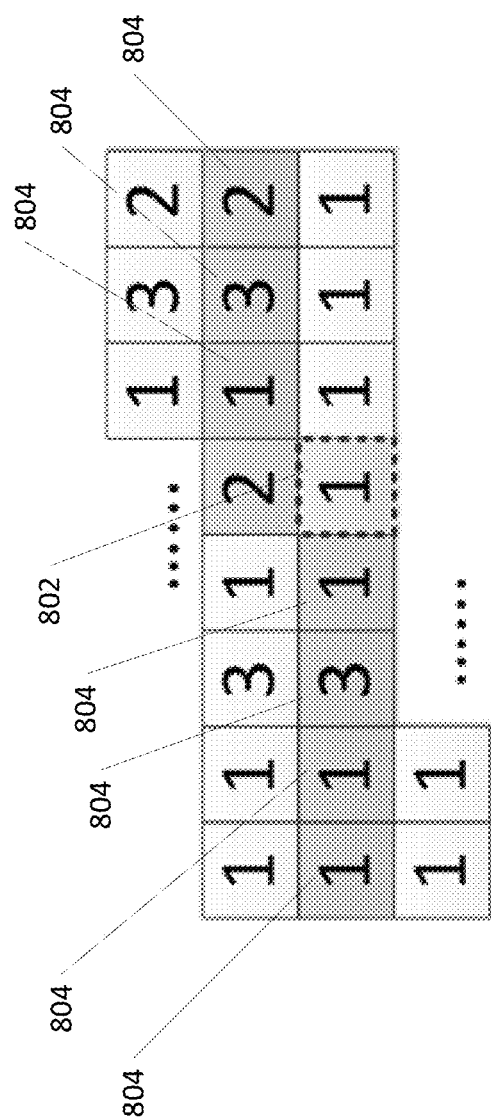
FIG. 8 illustrates an example of copy-left mode.

In run and copy modes coding, two consecutive copy modes may be merged as a single copy mode. A second copy mode may be used to signal a copy-left mode if the previous mode is a copy mode. For the copy-left mode, the starting position may be compared to its previous position, and may be used when the previous coding mode is the copy mode. The copy-left mode may signal the run value without signaling a palette index value. FIG. 8 illustrates an example of copy-left mode. If the run and copy modes are used and the previous mode of a pixel 802 is a copy mode (indicated by dark pixels 804 in FIG. 8), the pixel 802 may be coded as run mode. The palette index value may be signaled as 1, and the run value may be signaled. Signaling the palette index value as 1 may be omitted because the signaled index value may be the same as the previous mode. The copy-left mode may be used to reduce overhead; when the copy-left mode is enabled, the pixel 802 may be compared to its previous position, and the run value (e.g., only the run value) may be signaled.

When signaling the copy-left mode, the mode value of the copy-left mode may be coded similarly as the copy mode. At the decoder side, when the current mode and the previous mode are both signaled as the copy mode, the current mode may be interpreted as the copy-left mode. Accordingly, the copy-left mode may be signaled without using an additional mode value. If the previous mode is the copy-left mode and the current mode is the copy mode, the current mode may still be the copy mode.

A transition mode may allow palette indices for current pixels to be copied from a previously occurring pattern of palette indices. The location of the previously occurring pattern may be indicated relative to a recent (e.g., the most recent) previous appearance of an index value of a neighbor to the starting position.

Figure 9:
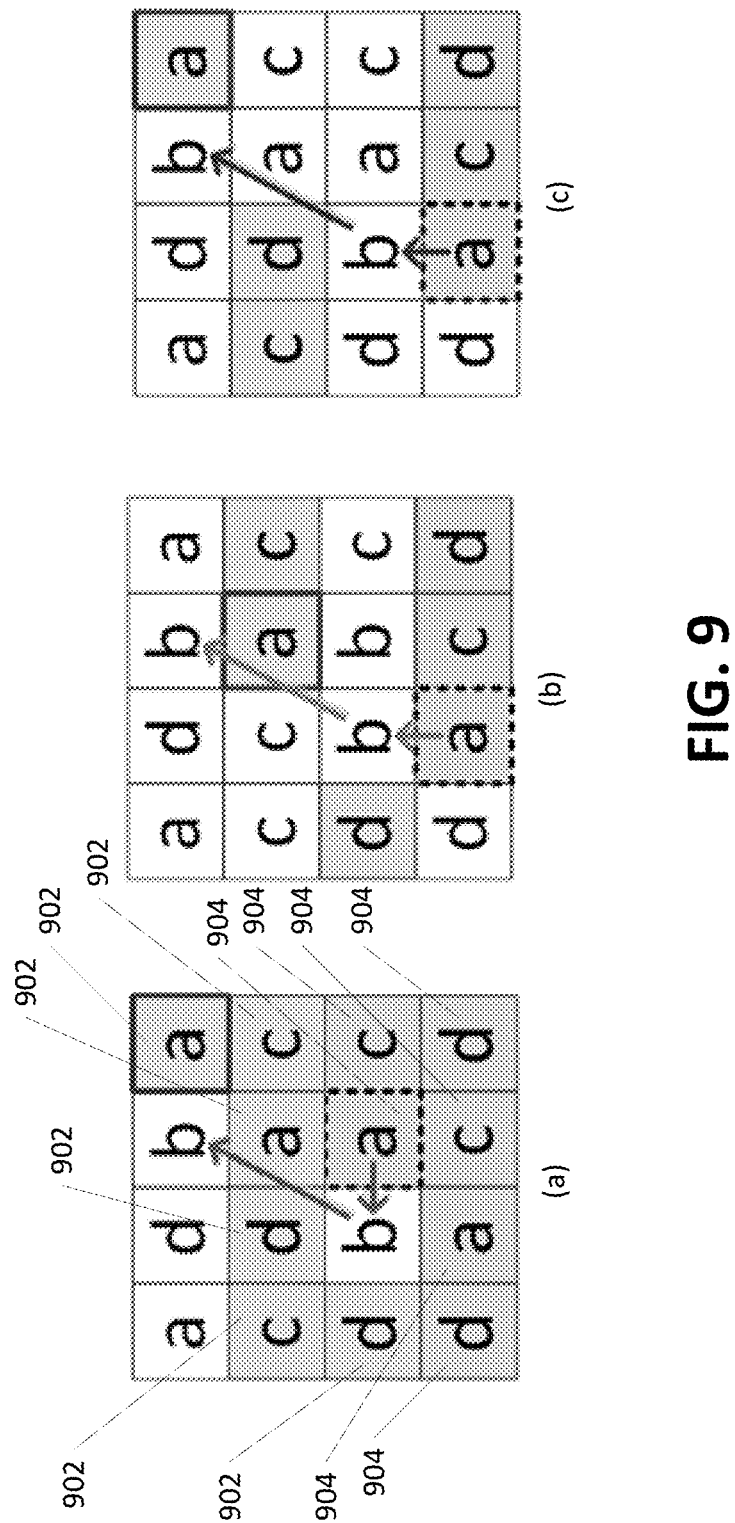
FIG. 9 illustrates examples of transition mode prediction.

The transition mode may involve selecting a neighbor of the starting position and determining its index value. The most recent previous appearance of the index value may be located and may be selected as the anchor position. A neighbor position of the anchor position may be chosen as the starting position for copying index values. For example, in example (a) of FIG. 9, the left position of the starting position (indicated in dashed line) may be chosen, and its last appearance position may be selected as the anchor position. The right position of the anchor position (indicated in bold) may be selected as the starting position to copy index values. In the examples shown in FIG. 9, the previously occurring index pattern, which may be the source for the copy, is indicated by reference numeral 902, and the copied indices, e.g., the indices encoded using the transition mode, are indicated by reference numeral 904.

For the transition mode, the neighboring position relative to the starting position that may be used to determine the anchor position may be signaled. The neighboring position relative to the anchor position that may be used as the start of the pattern to be copied may be signaled. The transition mode may be enabled when the CU has a large palette table size to mitigate the overhead of using the transition mode. For example, when the palette table size is small, the run and copy modes may be the frequently used palette modes. If the transition mode is also enabled, the total palette modes may be increased to three, and more bits may be used to signal the palette modes even if the transition mode is not chosen. When the palette table size is large, the transition mode may be used to search an index pattern to cover the prediction shortage of run or copy modes and to compensate the overhead by using the transition mode. The transition mode may be used without BWT coding.

Coding tools may be used to efficiently compress the palette index map. These coding tools may include index value coding, run value coding, and palette escape color prediction.

In palette coding, an index value may be transmitted when signaling a run mode. In an embodiment, an index value may be coded as a fixed length code word. For example, if the palette table size is 31, five bits may be used to encode a level value. Even if the index value is 1, five bits may be used to encode that value. In an embodiment, variable length coding (e.g., Exponential-Golomb coding) may be used to encode the index value. Coding tools may be used to efficiently encode the index value, such as index value reduction and/or escape color index reordering.

An encoder, e.g., the encoder of FIG. 3, may palette video data by producing a palette table comprising a plurality of color indices corresponding to respective colors of a plurality of colors. The encoder may create a palette index map. The palette index map may map one or more pixels of the video data to one or more color indices in the palette table. The encoder may generate palette index prediction data based on the palette index map. The palette index prediction data may comprise data that may indicate index values for at least a portion of the palette index map. Generating the palette index prediction data may include determining whether to adjust an index value of the palette index map based on a last index value.

To reduce the magnitude of the index value (e.g., color index), the index value may be modified according to a previous coding mode. For example, the index value may be decreased by one according to the last index value of the previous coding mode, which may be denoted as $pim_i$. If the current index value is larger than $pim_i$, the coded index value may be the current index value minus 1. Otherwise, the current index value may be unchanged. The number of bits used to code an index value may be effectively reduced. For example, if $pim_i$ is 6 and the current index value is 7, the coded index value is 7−1=6. When using the Exponential-Golomb coding with order 0, 7 is coded as 0001000. To encode 6, the code word is 00111; accordingly, the code word length may be reduced from seven bits to five bits. At the decoder side, the decoder may compare to $pim_i$ to reconstruct the current index value. If $pim_i$ is less than or equal to the current index value, the current index value may be increased by 1.

Figure 11:
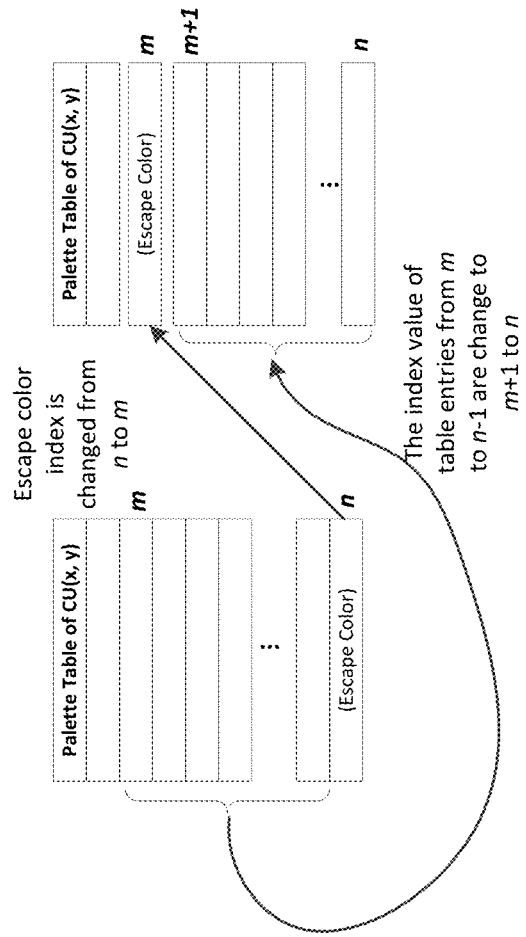
FIG. 11 illustrates an example of escape color index reordering.

To signal the position of escape color pixels, the index value of escape color pixels may be set to the maximum palette index value. The first index value may be set to zero. The appearance probability of an escape color may be higher than that of most major colors. To reduce the overhead of signaling the index value of escape color pixels, the index value of escape color pixels may be swapped with a front index value. As illustrated in FIG. 11, the escape color index value may be n before reordering. After reordering, the escape color index may be changed to m, and the original index values from m to (n−1) may be shifted to m+1 to n. The selection of a value of m may be based on the original, for example, such that indices from 0 to (m−1) may be more frequently used than the escape color index, and the original indices from m to (n−1) may be less frequently used than the escape color index. If such a value of m exists, the escape color index may be changed to m. For example, if the palette table size is 31, and the index value of the escape color is set to 31, after the index reordering, the index value of the escape color may be changed to 2, and the index values from 2 to 30 may be shifted to 3 to 31. By using the Exponential-Golomb coding with order 0, the index value 31 may be coded as 000011111. If the index value of the escape color is swapped with 2, the code word used to present the escape color may be 011; accordingly, the escape color index reordering may reduce the signaling overhead of escape color pixels.

In one-dimensional palette coding, a run value may be used to indicate the length of the consecutive positions segment. A variable length coding method (e.g., Golomb-Rice coding or Exponential-Golomb coding) may be used to effectively encode the run value. The setting of the Rice parameter may be a consideration in Golomb-Rice coding. For example, with the Rice parameter set at 0, the value 6 may be encoded as 1111110. With the Rice parameter set at 1, the code word may be 11100. The parameter setting may affect the coding efficiency. A value may be encoded using the best Rice parameter, but signaling these parameter settings may use overhead and may decrease coding performance. A Rice parameter may be estimated for a run mode or a non-run mode.

Figure 10:
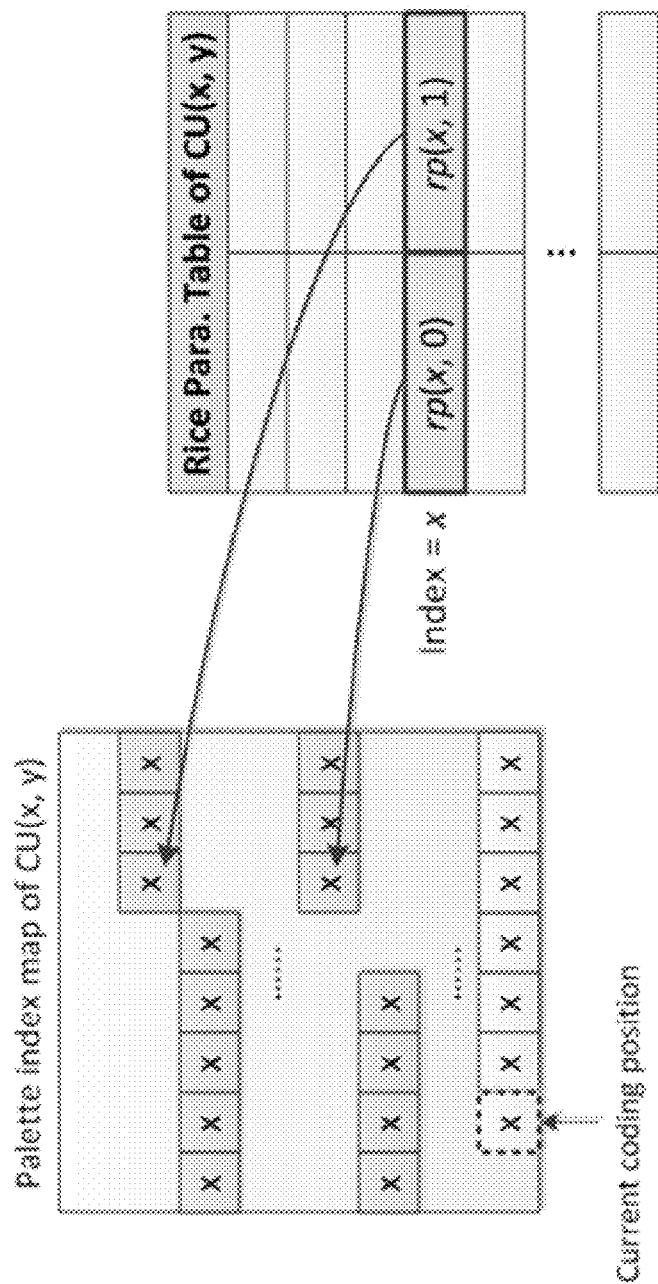
FIG. 10 illustrates an example of a Rice parameter lookup table for a run mode.

If the current palette coding mode is run mode, a Rice parameter lookup table may be used to predict the Rice parameter value. Rice parameters for the same index value may be highly correlated. The Rice parameter used for a current run value may be derived from previous Rice parameters. A Rice parameter lookup table may be used to record the previously used Rice parameters for a palette index. For example, as shown in FIG. 10, two previous Rice parameters rp(x,0) and rp(x,1) may be recorded for an index. These may represent the last and second-last Rice parameters for the index x. Equation (3) may be used to derive the Rice parameter:

$$crp_x = \begin{cases} \min(\text{RP\_LIMIT}, (rp(x, 0) + rp(x, 1)) \gg 1), \text{ when } rp(x, 0) \text{ is even} \\ \min(\text{RP\_LIMIT}, (rp(x, 0) + rp(x, 1) + 1) \gg 1), \text{ when } rp(x, 0) \text{ is odd,} \end{cases} \quad (3)$$

where $crp_x$ may be the estimated Rice parameter and RP_LIMIT may be the upper bound of the Rice parameter. After obtaining the estimated Rice parameter, the Rice parameter lookup table may be updated. Equations (4) and (5) may be used to update the table:

$$rp(x,1) = rp(x,0), \quad (4)$$

$$rp(x,0) = crp_x, \quad (5)$$

In a non-run mode, index copying may be performed, and various index values may be copied. An overlooking strategy may be used to obtain the Rice parameter for the non-run mode. Before encoding the index map, candidate Rice parameters may be tested. The candidate with the least overhead may be selected as the Rice parameter for the non-run mode. The estimation process may be performed as follows, for example:

```
Int function getRiceParameterForNonRunMode
set BestParameter to 0;
set overhead to 0;
set minimal_overhead to MAX_INT;
For (i=0; i<candidate_Rice_parameters; i++) {
    set overhead to 0;
    For (j=0; j<index_map_size; j++) {
    If palette_mode(j) is non-run mode
        overhead += calculate_overhead(run(j), i);
    }
    If overhead is smaller than minimal_overhead
        set minimal_overhead to overhead;
        set BestParameter to i;
}
return BestParameter;
```

Figure 12:
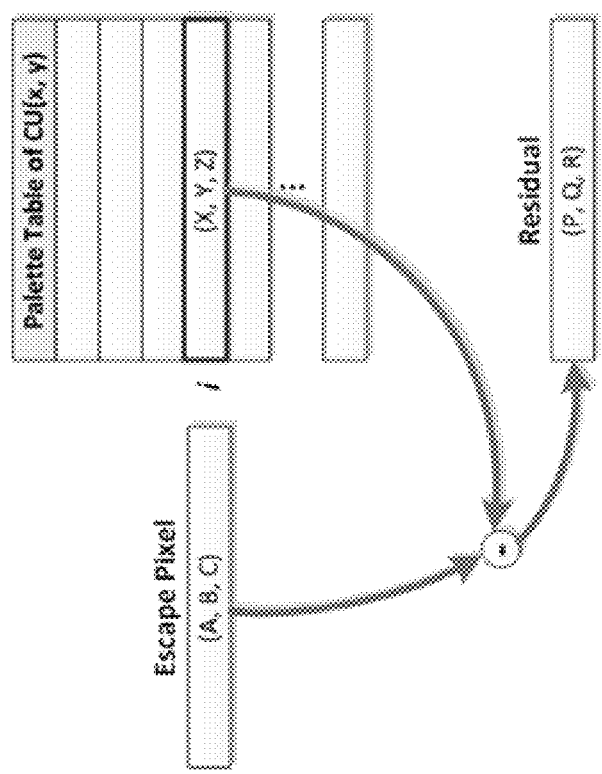
FIG. 12 illustrates an example of escape color prediction.

For escape color coding, the pixel value of a color component may be coded or predicted from its neighboring pixels. The escape color value may be predicted from the palette table entry with the minimal error. For example, as shown in FIG. 12, the palette table entry i with the minimal error to the escape color pixel may be selected. In entropy coding, the index value of the predicted table entry (e.g., the palette table entry determined by the encoder to have the minimal error compared to the escape color), the absolute difference value, and the sign bit may be signaled to the decoder side. At the decoder, these values may be used to reconstruct the escape color pixel.

The previously encoded escape colors may be used for the prediction of escape colors. The already coded escape colors may be stored in a list for a current coding unit. The most recent escape color may be placed at the beginning of the list, e.g., the most recent escape color may be the first entry of the list. The list may be a coded escape color stack. For a current escape color to be coded, a predictor (e.g., the best predictor) may be selected, for example, from the coded escape color stack or the palette table using rate distortion optimization criteria. A prediction type value (e.g., flag) may indicate whether the predictor is from the coded escape color stack or the palette table. An index may be coded to indicate which entry, e.g., an entry from the coded escape color stack or an entry from the palette table, is used as a predictor. An update process may be performed after the current escape color is coded. If the current coded escape color is predictive coded and the residual is not zero, or if the current escape color is not predictive coded, it may be regarded as a new escape color and may be added at the top of the stack. If the stack is full, then the last entry in the stack may be removed. The entry at the top of the stack may be associated with the smallest index value (e.g., zero), and the index values for other entries may be assigned in an increasing order. The coded escape color may be initialized in different ways before current coding unit coding. For example, the stack may be filled with those colors in the palette table predictor that may not be used to predict any colors in the palette table of the current coding unit.

Figure 13:
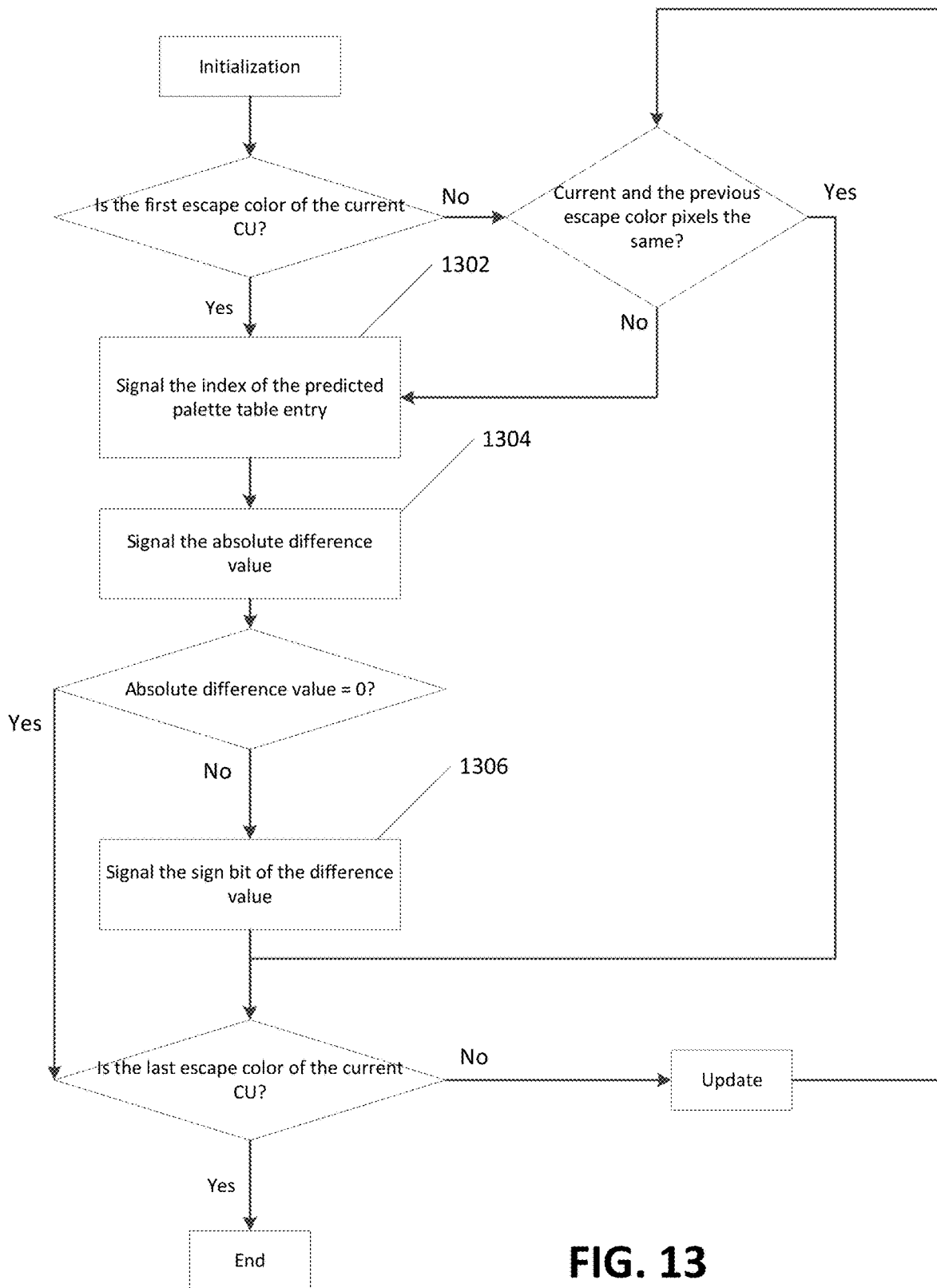
FIG. 13 illustrates an example of escape color encoding.

Escape color index adjustment, repeated escape color coding, and/or skip escape color coding decision may be used to further reduce the overhead of signaling escape color pixels. FIG. 13 illustrates an example of palette escape color prediction.

The escape color value may be the same as a palette table entry after quantization. The palette index of these escape colors may be adjusted to the index of the corresponding palette table entry. Adjustment may be performed after escape color quantization. For adjustment, quantized escape color pixels may be compared to palette table entries, and the escape color index may be reset to the index of the corresponding palette table entry when they are the same.

A one-bit flag may be signaled before escape color prediction to indicate whether the current escape color pixel is the same as the previous escape color pixel. Escape color prediction may be omitted once the current and previous escape color pixels are the same.

Before coding escape colors in a CU, a rate-distortion decision function may be used to determine whether to signal difference values. The decision function may be used to compare the rate-distortion cost between signaling and not signaling difference values. If the decision is to signal escape colors, the predicted table entry index, difference value, and sign bit may be signaled, for example, at 1302, 1304, and 1306 of FIG. 13. Otherwise, an escape color index may be adjusted to the index of a palette table entry, for example, with the best rate-distortion performance.

The principles disclosed herein may be disclosed in the context of Exponential-Golomb coding or Golomb-Rice coding as examples of variable length coding, but may be applicable to other variable length coding algorithms.

Syntax elements may be used to signal CUs that are coded with palette coding mode, e.g., based on the syntax of HEVC. The palette coding methods disclosed herein may be signaled in the bitstream using syntax elements, for example, as illustrated in Tables 1 and 2. As shown in Table 2, escape colors may be coded separately, e.g., in a separate loop, from major colors, e.g., colors represented in the palette table.

TABLE 1

|  | Descriptor |
|---|---|
| coding_unit( x0, y0, log2CbSize ) { |  |
|   if( transquant_bypass_enabled_flag ) |  |
|     cu_transquant_bypass_flag | ae(v) |
|   if( slice_type != I ) |  |
|     cu_skip_flag[ x0 ][ y0 ] | ae(v) |
|   nCbS = ( 1 << log2CbSize ) |  |
|   if( cu_skip_flag[ x0 ][ y0 ] ) |  |
|     prediction_unit( x0, y0, nCbS, nCbS ) |  |
|   else { |  |
|     if( intra_block_copy_enabled_flag ) |  |
|       intra_bc_flag[ x0 ][ y0 ] | ae(v) |
|     if( slice_type != I && !intra_bc_flag[ x0 ][ y0 ] ) |  |
|       pred_mode_flag | ae(v) |
|     if( CuPredMode[ x0 ][ y0 ] == MODE_INTRA ) |  |
|       palette_mode_flag[ x0 ][ y0 ] | ae(v) |
|       if( (CuPredMode[ x0 ][ y0 ] != MODE_INTRA \|\| intra_bc_flag[ x0 ][ y0 ] \|\| |  |
|         log2CbSize = = MinCbLog2SizeY) && !palette_mode_flag[ x0 ][ y0 ] ) |  |
|         part_mode | ae(v) |
|     if( CuPredMode[ x0 ][ y0 ] = = MODE_INTRA ) { |  |
|       if( PartMode = = PART_2Nx2N && pcm_enabled_flag && |  |
|         !intra_bc_flag[ x0 ][ y0 ] && !palette_mode_flag[ x0 ][ y0 ] && |  |
|         log2CbSize >= Log2MinIpcmCbSizeY && |  |
|         log2CbSize <= Log2MaxIpcmCbSizeY ) |  |
|         pcm_flag[ x0 ][ y0 ] | ae(v) |
|       if( pcm_flag[ x0 ][ y0 ] ) { |  |
|         while( !byte_aligned( ) ) |  |
|           pcm_alignment_zero_bit | f(1) |
|         pcm_sample( x0, y0, log2CbSize ) |  |

TABLE 1-continued

|  | Descriptor |
|---|---|

```
        } else if( intra_bc_flag[ x0 ][ y0 ] ) {
            mvd_coding( x0, y0, 2)
            if( PartMode = = PART_2NxN )
                mvd_coding( x0, y0 + ( nCbS / 2 ), 2)
            else if( PartMode = = PART_Nx2N )
                mvd_coding( x0 + ( nCbS / 2 ), y0, 2)
            else if( PartMode = = PART_NxN ) {
                mvd_coding( x0 + ( nCbS / 2 ), y0, 2)
                mvd_coding( x0, y0 + ( nCbS / 2 ), 2)
                mvd_coding( x0 + ( nCbS / 2 ), y0 + ( nCbS / 2 ), 2)
            }
        } else if ( palette_mode_flag[ x0 ][ y0 ] )
            palette_coding( x0, y0, nCbS, nCbS )
        else {
            pbOffset = ( PartMode = = PART_NxN ) ? ( nCbS / 2 ) : nCbS
            for( j = 0; j < nCbS; j = j + pbOffset )
                for( i = 0; i < nCbS; i = i + pbOffset )
                    prev_intra_luma_pred_flag[ x0 + i ][ y0 + j ]              ae(v)
            for( j = 0; j < nCbS; j = j + pbOffset )
                for( i = 0; i < nCbS; i = i + pbOffset )
                    if( prev_intra_luma_pred_flag[ x0 + i ][ y0 + j ] )
                        mpm_idx[ x0 + i ][ y0 + j ]                            ae(v)
                    else
                        rem_intra_luma_pred_mode[ x0 + i ][ y0 + j ]           ae(v)
            if( ChromaArrayType = = 3 )
                for( j = 0; j < nCbS; j = j + pbOffset )
                    for( i = 0; i < nCbS; i = i + pbOffset )
                        intra_chroma_pred_mode[ x0 + i ][ y0 + j ]             ae(v)
            else if( ChromaArrayType != 0 )
                intra_chroma_pred_mode[ x0 ][ y0 ]                             ae(v)
        }
    } else {
    if( PartMode = = PART_2Nx2N )
        prediction_unit( x0, y0, nCbS, nCbS )
    else if( PartMode = = PART_2NxN ) {
        prediction_unit( x0, y0, nCbS, nCbS / 2 )
        prediction_unit( x0, y0 + (nCbS / 2 ), nCbS, nCbS / 2 )
    } else if( PartMode = = PART_Nx2N ) {
        prediction_unit( x0, y0, nCbS / 2, nCbS )
        prediction_unit( x0 + ( nCbS / 2 ), y0, nCbS / 2, nCbS )
    } else if( PartMode = = PART_2NxnU ) {
        prediction_unit( x0, y0, nCbS, nCbS / 4 )
        prediction_unit( x0, y0 + ( nCbS / 4 ), nCbS, nCbS * 3 / 4 )
    } else if( PartMode = = PART_2NxnD ) {
        prediction_unit( x0, y0, nCbS, nCbS * 3 / 4 )
        prediction_unit( x0, y0 + ( nCbS * 3 / 4 ), nCbS, nCbS / 4 )
    } else if( PartMode = = PART_nLx2N ) {
        prediction_unit( x0, y0, nCbS / 4, nCbS )
        prediction_unit( x0 + ( nCbS / 4 ), y0, nCbS * 3 / 4, nCbS )
    } else if( PartMode = = PART_nRx2N ) {
        prediction_unit( x0, y0, nCbS * 3 / 4, nCbS )
        prediction_unit( x0 + ( nCbS * 3 / 4 ), y0, nCbS / 4, nCbS )
    } else { /* PART_NxN */
```

TABLE 2

|  | Descriptor |
|---|---|

```
palette_coding( x0, y0, nCbWidth, nCbHeight ) {
    palette_size_minus1[ x0 ][ y0 ]                                            ae(v)
    for( n = 0; n < palette_size_minus1[ x0 ][ y0 ]; n ++ ) {
        for( cIdx = 0; cIdx < 3; cIdx++)
            palette[ x0 ][ y0 ][n][ cIdx ]                                     ae(v)
    }
    palette_index_scan_order[ x0 ][ y0 ]                                       ae(v)
    palette_bwt_flag[ x0 ][ y0 ]                                               ae(v)
    if( palette_bwt_flag[ x0 ][ y0 ] )
        palette_bwt_eob_pos[ x0 ][ y0 ]                                        ae(v)
    scanPos = 0
    non_run_mode_rice_parameter                                                ae(v)
    while ( scanPos < nCbWidth * nCbHeight ) {
        palette_mode[ x0 ][ y0 ][ scanPos ]                                    ae(v)
        if( palette_mode == RUN_MODE )
            mapped_palette_index[ x0 ][ y0 ][ scanPos ]                        ae(v)
```

TABLE 2-continued

| | Descriptor |
|---|---|
| ```
        else if (palette_mode==transition_mode) {
            transition_mode_neighbor_position
            transition_mode_copy_direction
        }
        run[ x0 ][ y0 ][ scanPos ]
        scanPos += run
        scanPos ++
    }
    scanPos = 0
    while ( scanPos < nCbWidth * nCbHeight ) {
        if ( palette_index[ x0 ][ y0 ][ scanPos ] == palette_size_minus1[ x0 ][ y0 ] +
1 ) {
            repeated_escape_color_flag[ x0 ][ y0 ][ scanPos ]
            if( !escape_color_pred_flag[ x0 ][ y0 ][ scanPos ] ) {
                predicted_palette_table_index[ x0 ][ y0 ][ scanPos ]
                for( cIdx = 0; cIdx < 3; cIdx ++ ) {
                    escape_color_residue_absolute_level[ x0 ][ y0 ][ scanPos ][ cIdx ]
                    if( escape_color_resi_abs_level[ x0 ][ y0 ][ scanPos ][ cIdx ] )
                        escape_color_residue_sign[ x0 ][ y0 ][ scanPos ][ cIdx ]
                }
            }
        }
        scanPos ++
    }
}
``` | ae(v)<br>ae(v)<br><br>ae(v)<br><br><br><br><br><br><br><br>ae(v)<br><br>ae(v)<br><br>ae(v)<br><br>ae(v) |

A syntax element palette_index_scan_order may represent a predefined scan order. If palette_index_scan_order is 0, the raster scan order may be used in the palette index prediction. If palette_index_scan_order is 1, a transverse scan order may be used. If palette_index_scan_order is 2, a zig-zag scan order may be used.

A syntax element palette_bwt_flag may indicate whether a BWT coding method is enabled. If palette_bwt_flag is 1, the BWT coding method may be enabled. If palette_bwt_flag is 0, the BWT coding method may be disabled.

A syntax element palette_bwt_eob_position may represent an end of block position for BWT decoding.

A syntax element non_run_mode_rice_parameter may represent a Rice parameter for decoding the run value for non-run mode.

A syntax element palette_mode may represent a palette coding mode (e.g., run mode, copy mode, or transition mode).

A syntax element transition_mode_neighbor_position may represent the neighbor position relative to the start position used to locate the anchor position in transition mode. If transition_mode_neighbor_position is 1, the upper neighbor position may be used. If transition_mode_neighbor_position is 0, the left neighbor position may be used.

A syntax element transition_mode_copy_direction may represent the neighbor position relative to the anchor position from which to start copying index values in the transition mode. If transition_mode_copy_direction is 1, the lower neighbor position may be indicated. If transition_mode_copy_direction is 0, the right neighbor position may be indicated.

A syntax element run may represent a number of consecutive locations with the same palette index (e.g., "run_mode_flag=1") or the number of consecutive locations with the same palette index as the position in the above row (e.g., as used in the copy mode). The run value may be decoded by using the Rice parameter lookup table in run mode. For the non-run mode, the run value may be decoded by the non_run_mode_rice_parameter.

A syntax element repeated_escape_color_flag may indicate whether an escape color value is repeated. If repeated_escape_color_flag is 1, the current escape color value may be set to the previous escape color value. If repeated_escape_color_flag is 0, the current escape color value may be different from the previous escape color value.

A syntax element predicted_palette_table_index may represent the index value of the predicted palette table entry for the current escape color.

A syntax element escape_color_residue_absolute_value may represent the absolute difference between the current escape color and the predicted palette table entry.

A syntax element escape_color_residue_sign may represent the sign value of the difference between the current escape color and the predicted palette table entry.

The palette coding methods disclosed herein may be signaled in the bitstream using syntax elements, for example, as illustrated in Table 3. Escape color values may be coded separately from a coding loop of palette indices.

For example, video data may be encoded by producing a palette table comprising indices that may represent palette colors. A palette index map may be created for a coding unit of the video data. The palette index map may comprise indices, e.g., a series of indices. The indices may be taken, for example, from the indices in the palette table or from an index that may indicate an escape color mode. The indices may selectively map pixels of the coding unit to the palette colors or to the escape color mode. The palette table and palette index map parameters that may represent the series of indices of the palette index map for the coding unit may be transmitted in a video bitstream. After the palette index map parameters are transmitted, additional parameters may be transmitted in the video bitstream. These additional parameters may indicate the escape color values for the pixels of the coding unit mapped to the escape color mode.

For example, video data may be decoded by receiving in a bitstream a palette table comprising a plurality of indices that may represent palette colors. Palette index map parameters may also be received in a video bitstream. The palette index map parameters may represent indices, e.g., a series of indices. The indices may map one or more pixels of a coding unit of the video data to a palette color of the palette table or to an escape color mode. The palette index map parameters may be used to determine the pixels of the coding unit that may be mapped by the palette index map to the escape color mode. Escape color parameters may be received. The escape color parameters may indicate the escape color values for the pixels of the coding unit mapped to the escape color mode. The colors for the pixels of the coding unit may be reconstructed based on the received palette index map parameters and the received escape color parameters.

TABLE 3

|  | Descriptor |
|---|---|
| coding_unit( x0, y0, log2CbSize ) { | |
|   if( transquant_bypass_enabled_flag ) | |
|     cu_transquant_bypass_flag | ae(v) |
|   nCbS = ( 1 << log2CbSize ) | |
|   if (palette_mode_flag) { | |
|     palette_index_scan_order | ae(v) |
|     palette_bwt_flag | ae(v) |
|     if (palette_bwt_flag) { | |
|       palette_bwt_eob_position | ae(v) |
|     } | |
|     palette_size_minus1[x0][y0] | ae(v) |
|     for (cIdx = 0; cIdx < 3; cIdx ++) | |
|       for( i = 0; i <=palette_size_minus1[x0][y0]; i ++ ) | |
|         palette[x0][y0][ cIdx ][i] | ae(v) |
|     scanPos = 0 | |
|   non_run_mode_rice_parameter | ae(v) |
|   while (scanPos < nCbS * nCbS) { | |
|     palette_mode | ae(v) |
|     if (palette_mode==run_mode) { | |
|       palette_index | ae(v) |
|       if (palette_index==reordered_escape_color_index) | |
|         palette_index = palette_size_minus1[x0][y0]+1 | |
|       else if (palette_index> reordered_escape_color_index) | |
|         palette_index = palette_index − 1 | |
|       if (last_comp_index<=palette_index) | |
|         palette_index = palette_index+1 | |
|     } | |
|     else if (palette_mode==transition_mode) { | |
|       transition_mode_neighbor_position | ae(v) |
|       transition_mode_copy_direction | ae(v) |
|     } | |
|     run | ae(v) |
|     runPos= 0 | |
|     while (runPos <= run) { | |
|       if (run_mode_flag){ | |
|         paletteMap[ x0 ][ y0 ] [ scanPos ] = palette_index | |
|         last_palette_mode = run_mode | |
|       } | |
|       else if (copy_mode_flag && last_palette_mode != copy_mode){ /* copy mode */ | |
|         paletteMap[ x0 ][ y0 ] [ scanPos ] = paletteMap[ x0 ][ y0 ] [ scanPos − nCbS ] | |
|         last_palette_mode = copy_mode | |
|       } | |
|       else if (copy_mode_flag && last_palette_mode == copy_mode) { /* copy-left mode */ | |
|         paletteMap[ x0 ][ y0 ] [ scanPos ] = paletteMap[ x0 ][ y0 ] [ scanPos −1 ] | |
|         last_palette_mode = copy_left_mode | |
|       } | |
|       else if (transition_mode_flag){ | |
|         paletteMap[ x0 ][ y0 ] [ scanPos ] = transition_position(runPos, transition_mode_neighbor_position, transition_mode_copy_direction) | |
|         last_palette_mode = transition_mode | |
|       } | |
|       runPos ++ | |
|       scanPos++ | |
|     } | |
|   } | |
|   if (!skip_escape_color_coding_flag) { | |
|     while (scanPos < nCbS * nCbS) { | |
|       if (paletteMap[ x0 ][ y0 ] [ scanPos ]== palette_size_minus1[x0][y0]+1) { | |
|         repeated_escape_color_flag | ae(v) |
|         if (!repeated_escape_color_flag) { | |
|           predicted_palette_table_index | ae(v) |
|           for (cIdx = 0; cIdx < 3; cIdx ++) { | |
|             escape_color_residue_absolute_value | ae(v) |
|             if(!absolute_escape_color_residue) { | |
|               escape_color_residue_sign | ae(v) |
|             } | |
|           } | |
|         } | |
|       } | |
|     } | |

TABLE 3-continued

| | Descriptor |
|---|---|
| runPos ++ | |
| scanPos++ | |
| } | |
| } | |
| } | |
| } | |
| else { | |
| if( slice_type != I ) | |
| ..... | |
| } | |

A syntax element palette_index_scan_order may represent the predefined scan order. If palette_index_scan_order is equal to 0, the raster scan order may be used in the palette index prediction process. If palette_index_scan_order is equal to 1, the traverse scan may be used. If palette_index_scan_order is equal to 2, a zig-zag scan order may be used.

A syntax element palette_bwt_flag may indicate whether the BWT coding method is enabled. If palette_bwt_flag is equal to 1, the BWT coding method may be enabled. If palette_bwt_flag is equal to 0, the BWT coding method may be disabled.

A syntax element palette_bwt_eob_position may represent the end of block position for BWT decoding.

A syntax element non_run_mode_rice_parameter may represent the rice parameter for decoding the run value for a non-run mode.

A syntax element palette_mode may represent a palette coding mode (e.g., run mode, copy mode or transition mode).

A syntax element transition_mode_neighbor_position may represent the neighbor position relative to the start position that may be used to locate the anchor position in a transition mode. If transition_mode_neighbor_position is equal to 1, the upper neighbor position may be used. If transition_mode_neighbor_position is equal to 0, the left neighbor position may be used.

A syntax element transition_mode_copy_direction may represent the neighbor position relative to the anchor position from which to start copying index values in a transition mode. If transition_mode_copy_direction is equal to 1, copying may start from the lower neighbor position. If transition_mode_copy_direction equal to 0, copying may start from the right neighbor position.

A syntax element run may represent the number of consecutive locations with the same palette index ("run_mode_flag=1") or the number of consecutive locations with the same palette index as the position in the above row (as used in "copy mode"). The run value may be decoded by using the Rice parameter lookup table in run mode. For the non-run mode, the run value may be decoded by the non_run_mode_rice_parameter.

If a syntax element repeated_escape_color_flag is equal to 1, the current escape color value may be set to the previous escape color value. If repeated_escape_color_flag is equal to 0, the current escape color value may not be the same as the previous escape color value.

A syntax element predicted_palette_table_index may represent the index value of the predicted palette table entry for the current escape color.

A syntax element escape_color_residue_absolute_value may represent the absolute difference value between the current escape color and the predicted palette table entry.

A syntax element escape_color_residue_sign may represent the sign value of the difference value between the current escape color and the predicted palette table entry.

A decoder, e.g., the decoder of FIG. 2, may palette decode video data, for example, by receiving in a video bitstream a palette table. The palette table may include a plurality of indices that may represent palette colors of a plurality of colors. The decoder may receive palette index map parameters in the video bitstream. The palette index map parameters may represent a series of indices. One or more indices, e.g., each index, of the series of indices may map one or more pixels of a coding unit of the video data to either a palette color of the palette table or to an escape color mode. Based on the palette index map parameters, the decoder may determine the pixels of the coding unit that may be mapped by the palette index map to the escape color mode. In a separate loop, e.g., after receiving the set of index map parameters for the coding unit, the decoder may receive escape color parameters that may indicate the escape color values for each of the pixels of the coding unit mapped to the escape color mode, as shown, for example, in one or more of Tables 1, 2, and 3. The decoder may reconstruct the colors for the pixels of the coding unit based on the received palette index map parameters and the received escape color parameters.

An encoder, e.g., the encoder of FIG. 3, may palette code video data by producing a palette table that may comprise a plurality of indices that may represent palette colors of a plurality of colors. The encoder may create a palette index map for a coding unit of the video data. The palette index map may comprise a series of indices. One or more indices, e.g., each index, of the series may be taken either from the plurality of indices in the palette table or from an index indicative of an escape color mode. The indices may selectively map pixels of the coding unit to the palette colors or to the escape color mode. The encoder may transmit palette table and palette index map parameters in a video bitstream. The palette index map parameters may represent the series of indices of the palette index map for the coding unit. After the palette index map parameters are transmitted, the encoder may transmit one or more additional parameters in the video bitstream, as shown, for example, in one or more of Tables 1, 2, and 3. These additional parameters may indicate the escape color values for the pixels of the coding unit mapped to the escape color mode.

Figure 14A:
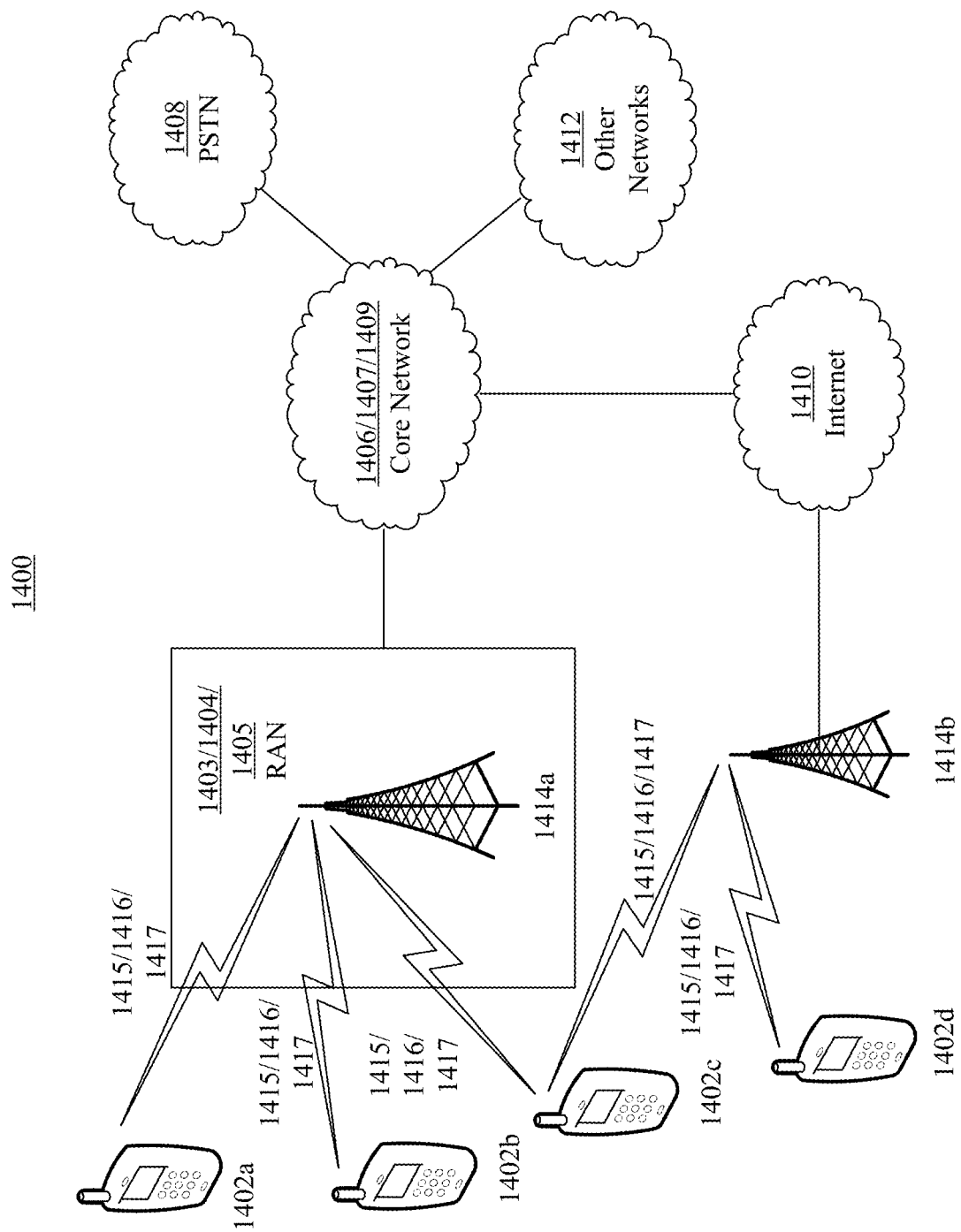
FIG. 14A is a system diagram of an example communications system in which one or more disclosed embodiments may be implemented.

FIG. 14A is a diagram of an example communications system 1400 in which one or more disclosed embodiments may be implemented. The communications system 1400 may be a multiple access system that provides content, such as voice, data, video, messaging, broadcast, etc., to multiple wireless users. The communications system 1400 may enable multiple wireless users to access such content through the sharing of system resources, including wireless bandwidth. For example, the communications system 1400 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 14A, the communications system 1400 may include wireless transmit/receive units (WTRUs) 1402a, 1402b, 1402c, and/or 1402d (which generally or collectively may be referred to as WTRU 1402), a radio access network (RAN) 1403/1404/1405, a core network 1406/1407/1409, a public switched telephone network (PSTN) 1408, the Internet 1410, and other networks 1412, though it will be appreciated that the disclosed embodiments contemplate any number of WTRUs, base stations, networks, and/or network elements. Each of the WTRUs 1402a, 1402b, 1402c, 1402d may be any type of device configured to operate and/or communicate in a wireless environment. By way of example, the WTRUs 1402a, 1402b, 1402c, 1402d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 1400 may also include a base station 1414a and a base station 1414b. Each of the base stations 1414a, 1414b may be any type of device configured to wirelessly interface with at least one of the WTRUs 1402a, 1402b, 1402c, 1402d to facilitate access to one or more communication networks, such as the core network 1406/1407/1409, the Internet 1410, and/or the networks 1412. By way of example, the base stations 1414a, 1414b may be a base transceiver station (BTS), a Node-B, an eNode B, a Home Node B, a Home eNode B, a site controller, an access point (AP), a wireless router, and the like. While the base stations 1414a, 1414b are each depicted as a single element, it will be appreciated that the base stations 1414a, 1414b may include any number of interconnected base stations and/or network elements.

The base station 1414a may be part of the RAN 1403/1404/1405, which may also include other base stations and/or network elements (not shown), such as a base station controller (BSC), a radio network controller (RNC), relay nodes, etc. The base station 1414a and/or the base station 1414b may be configured to transmit and/or receive wireless signals within a particular geographic region, which may be referred to as a cell (not shown). The cell may further be divided into cell sectors. For example, the cell associated with the base station 1414a may be divided into three sectors. Thus, in one embodiment, the base station 1414a may include three transceivers, e.g., one for each sector of the cell. In another embodiment, the base station 1414a may employ multiple-input multiple output (MIMO) technology and, therefore, may utilize multiple transceivers for each sector of the cell.

The base stations 1414a, 1414b may communicate with one or more of the WTRUs 1402a, 1402b, 1402c, 1402d over an air interface 1415/1416/1417, which may be any suitable wireless communication link (e.g., radio frequency (RF), microwave, infrared (IR), ultraviolet (UV), visible light, etc.). The air interface 1415/1416/1417 may be established using any suitable radio access technology (RAT).

More specifically, as noted above, the communications system 1400 may be a multiple access system and may employ one or more channel access schemes, such as CDMA, TDMA, FDMA, OFDMA, SC-FDMA, and the like.

For example, the base station 1414a in the RAN 1403/1404/1405 and the WTRUs 1402a, 1402b, 1402c may implement a radio technology such as Universal Mobile Telecommunications System (UMTS) Terrestrial Radio Access (UTRA), which may establish the air interface 1415/1416/1417 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 1414a and the WTRUs 1402a, 1402b, 1402c may implement a radio technology such as Evolved UMTS Terrestrial Radio Access (E-UTRA), which may establish the air interface 1415/1416/1417 using Long Term Evolution (LTE) and/or LTE-Advanced (LTE-A).

In other embodiments, the base station 1414a and the WTRUs 1402a, 1402b, 1402c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 1414b in FIG. 14A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 1414b and the WTRUs 1402c, 1402d may implement a radio technology such as IEEE 802.11 to establish a wireless local area network (WLAN). In another embodiment, the base station 1414b and the WTRUs 1402c, 1402d may implement a radio technology such as IEEE 802.15 to establish a wireless personal area network (WPAN). In yet another embodiment, the base station 1414b and the WTRUs 1402c, 1402d may utilize a cellular-based RAT (e.g., WCDMA, CDMA2000, GSM, LTE, LTE-A, etc.) to establish a picocell or femtocell. As shown in FIG. 14A, the base station 1414b may have a direct connection to the Internet 1410. Thus, the base station 1414b may not be required to access the Internet 1410 via the core network 1406/1407/1409.

The RAN 1403/1404/1405 may be in communication with the core network 1406/1407/1409, which may be any type of network configured to provide voice, data, applications, and/or voice over internet protocol (VoIP) services to one or more of the WTRUs 1402a, 1402b, 1402c, 1402d. For example, the core network 1406/1407/1409 may provide call control, billing services, mobile location-based services, pre-paid calling, Internet connectivity, video distribution, etc., and/or perform high-level security functions, such as user authentication. Although not shown in FIG. 14A, it will be appreciated that the RAN 1403/1404/1405 and/or the core network 1406/1407/1409 may be in direct or indirect communication with other RANs that employ the same RAT as the RAN 1403/1404/1405 or a different RAT. For example, in addition to being connected to the RAN 1403/1404/1405, which may be utilizing an E-UTRA radio technology, the core network 1406/1407/1409 may also be in communication with another RAN (not shown) employing a GSM radio technology.

The core network 1406/1407/1409 may also serve as a gateway for the WTRUs 1402a, 1402b, 1402c, 1402d to access the PSTN 1408, the Internet 1410, and/or other networks 1412. The PSTN 1408 may include circuit-switched telephone networks that provide plain old telephone service (POTS). The Internet 1410 may include a global system of interconnected computer networks and devices that use common communication protocols, such as the transmission control protocol (TCP), user datagram protocol (UDP) and the internet protocol (IP) in the TCP/IP internet protocol suite. The networks 1412 may include wired or wireless communications networks owned and/or operated by other service providers. For example, the networks 1412 may include another core network connected to one or more RANs, which may employ the same RAT as the RAN 1403/1404/1405 or a different RAT.

Some or all of the WTRUs 1402a, 1402b, 1402c, 1402d in the communications system 1400 may include multi-mode capabilities, e.g., the WTRUs 1402a, 1402b, 1402c, 1402d may include multiple transceivers for communicating with different wireless networks over different wireless links. For example, the WTRU 1402c shown in FIG. 14A may be configured to communicate with the base station 1414a, which may employ a cellular-based radio technology, and with the base station 1414b, which may employ an IEEE 802 radio technology.

Figure 14B:
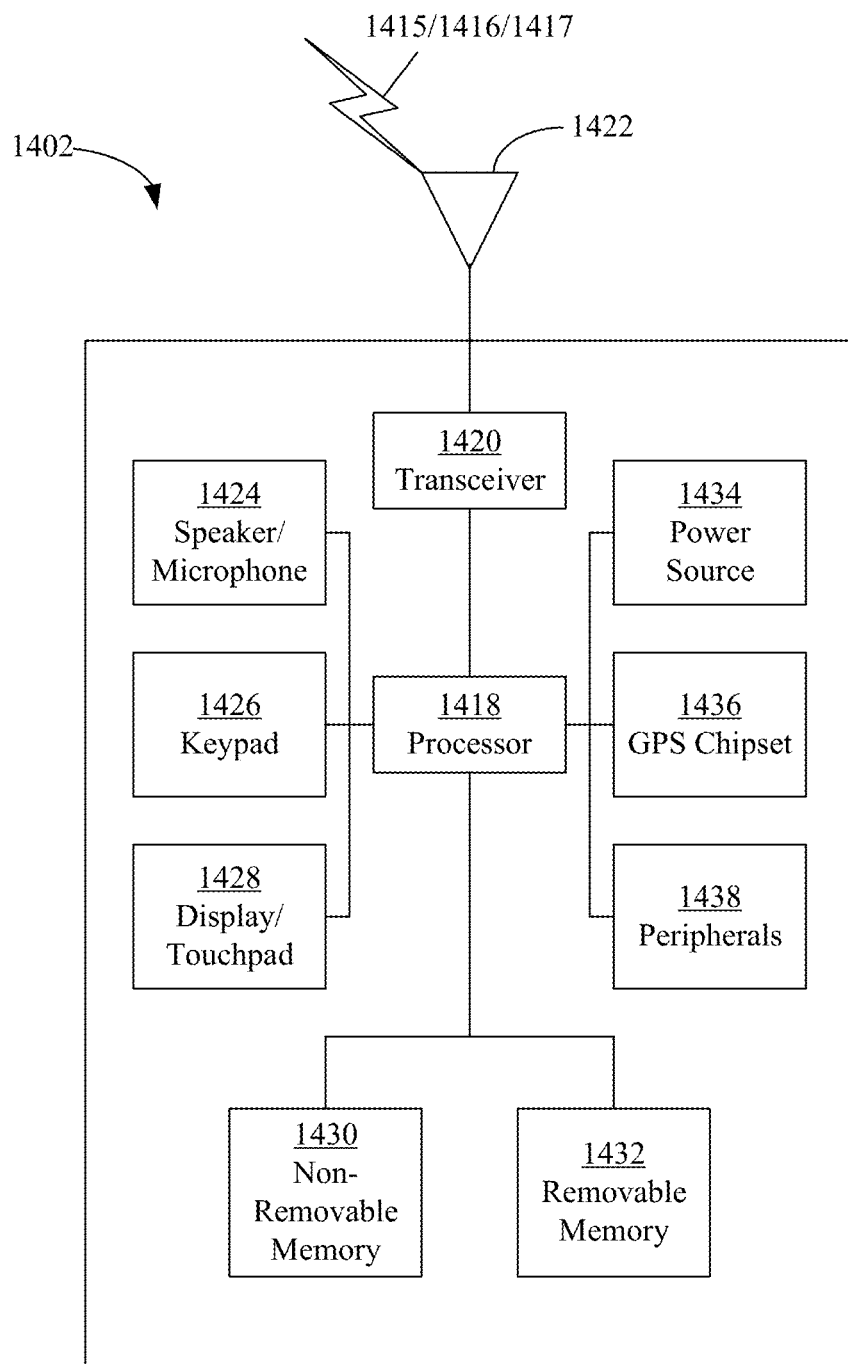
FIG. 14B is a system diagram of an example wireless transmit/receive unit (WTRU) that may be used within the communications system illustrated in FIG. 14A.

FIG. 14B is a system diagram of an example WTRU 1402. As shown in FIG. 14B, the WTRU 1402 may include a processor 1418, a transceiver 1420, a transmit/receive element 1422, a speaker/microphone 1424, a keypad 1426, a display/touchpad 1428, non-removable memory 1430, removable memory 1432, a power source 1434, a global positioning system (GPS) chipset 1436, and other peripherals 1438. It will be appreciated that the WTRU 1402 may include any sub-combination of the foregoing elements while remaining consistent with an embodiment. Also, embodiments contemplate that the base stations 1414a and 1414b, and/or the nodes that base stations 1414a and 1414b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 14B and described herein.

The processor 1418 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1418 may perform signal coding, data processing, power control, input/output processing, and/or any other functionality that enables the WTRU 1402 to operate in a wireless environment. The processor 1418 may be coupled to the transceiver 1420, which may be coupled to the transmit/receive element 1422. While FIG. 14B depicts the processor 1418 and the transceiver 1420 as separate components, it will be appreciated that the processor 1418 and the transceiver 1420 may be integrated together in an electronic package or chip.

The transmit/receive element 1422 may be configured to transmit signals to, or receive signals from, a base station (e.g., the base station 1414a) over the air interface 1415/1416/1417. For example, in one embodiment, the transmit/receive element 1422 may be an antenna configured to transmit and/or receive RF signals. In another embodiment, the transmit/receive element 1422 may be an emitter/detector configured to transmit and/or receive IR, UV, or visible light signals, for example. In yet another embodiment, the transmit/receive element 1422 may be configured to transmit and receive both RF and light signals. It will be appreciated that the transmit/receive element 1422 may be configured to transmit and/or receive any combination of wireless signals.

In addition, although the transmit/receive element 1422 is depicted in FIG. 14B as a single element, the WTRU 1402 may include any number of transmit/receive elements 1422. More specifically, the WTRU 1402 may employ MIMO technology. Thus, in one embodiment, the WTRU 1402 may include two or more transmit/receive elements 1422 (e.g., multiple antennas) for transmitting and receiving wireless signals over the air interface 1415/1416/1417.

The transceiver 1420 may be configured to modulate the signals that are to be transmitted by the transmit/receive element 1422 and to demodulate the signals that are received by the transmit/receive element 1422. As noted above, the WTRU 1402 may have multi-mode capabilities. Thus, the transceiver 1420 may include multiple transceivers for enabling the WTRU 1402 to communicate via multiple RATs, such as UTRA and IEEE 802.11, for example.

The processor 1418 of the WTRU 1402 may be coupled to, and may receive user input data from, the speaker/microphone 1424, the keypad 1426, and/or the display/touchpad 1428 (e.g., a liquid crystal display (LCD) display unit or organic light-emitting diode (OLED) display unit). The processor 1418 may also output user data to the speaker/microphone 1424, the keypad 1426, and/or the display/touchpad 1428. In addition, the processor 1418 may access information from, and store data in, any type of suitable memory, such as the non-removable memory 1430 and/or the removable memory 1432. The non-removable memory 1430 may include random-access memory (RAM), read-only memory (ROM), a hard disk, or any other type of memory storage device. The removable memory 1432 may include a subscriber identity module (SIM) card, a memory stick, a secure digital (SD) memory card, and the like. In other embodiments, the processor 1418 may access information from, and store data in, memory that is not physically located on the WTRU 1402, such as on a server or a home computer (not shown).

The processor 1418 may receive power from the power source 1434, and may be configured to distribute and/or control the power to the other components in the WTRU 1402. The power source 1434 may be any suitable device for powering the WTRU 1402. For example, the power source 1434 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1418 may also be coupled to the GPS chipset 1436, which may be configured to provide location information (e.g., longitude and latitude) regarding the current location of the WTRU 1402. In addition to, or in lieu of, the information from the GPS chipset 1436, the WTRU 1402 may receive location information over the air interface 1415/1416/1417 from a base station (e.g., base stations 1414a, 1414b) and/or determine its location based on the timing of the signals being received from two or more nearby base stations. It will be appreciated that the WTRU 1402 may acquire location information by way of any suitable location-determination implementation while remaining consistent with an embodiment.

The processor 1418 may further be coupled to other peripherals 1438, which may include one or more software and/or hardware modules that provide additional features, functionality and/or wired or wireless connectivity. For example, the peripherals 1438 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 14C:
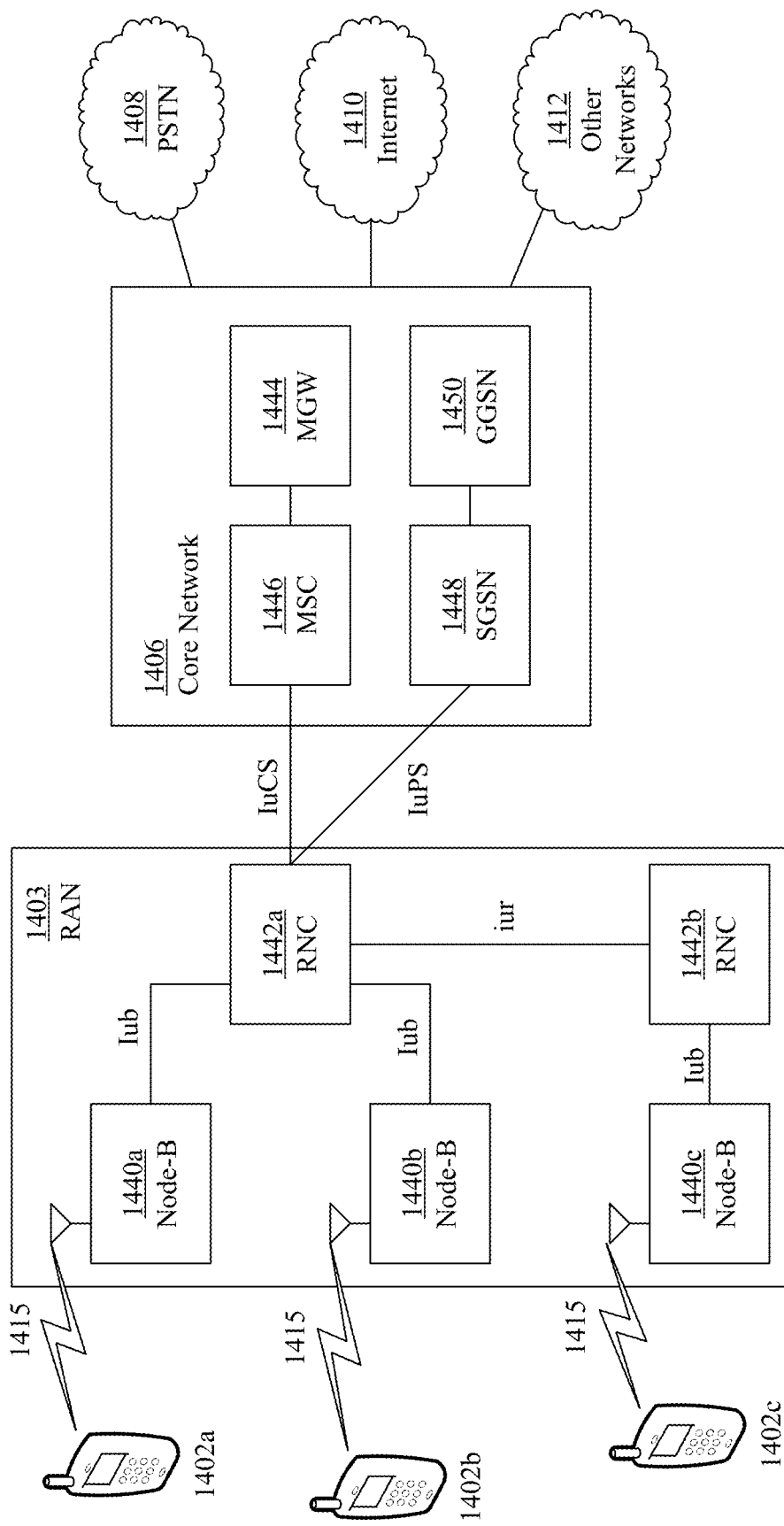
FIG. 14C is a system diagram of an example radio access network and an example core network that may be used within the communications system illustrated in FIG. 14A.

FIG. 14C is a system diagram of the RAN 1403 and the core network 1406 according to an embodiment. As noted above, the RAN 1403 may employ a UTRA radio technology to communicate with the WTRUs 1402a, 1402b, 1402c over the air interface 1415. The RAN 1403 may also be in communication with the core network 1406. As shown in FIG. 14C, the RAN 1403 may include Node-Bs 1440a, 1440b, 1440c, which may each include one or more transceivers for communicating with the WTRUs 1402a, 1402b, 1402c over the air interface 1415. The Node-Bs 1440a, 1440b, 1440c may each be associated with a particular cell (not shown) within the RAN 1403. The RAN 1403 may also include RNCs 1442a, 1442b. It will be appreciated that the RAN 1403 may include any number of Node-Bs and RNCs while remaining consistent with an embodiment.

As shown in FIG. 14C, the Node-Bs 1440a, 1440b may be in communication with the RNC 1442a. Additionally, the Node-B 1440c may be in communication with the RNC 1442b. The Node-Bs 1440a, 1440b, 1440c may communicate with the respective RNCs 1442a, 1442b via an Iub interface. The RNCs 1442a, 1442b may be in communication with one another via an Iur interface. Each of the RNCs 1442a, 1442b may be configured to control the respective Node-Bs 1440a, 1440b, 1440c to which it is connected. In addition, each of the RNCs 1442a, 1442b may be configured to carry out or support other functionality, such as outer loop power control, load control, admission control, packet scheduling, handover control, macrodiversity, security functions, data encryption, and the like.

The core network 1406 shown in FIG. 14C may include a media gateway (MGW) 1444, a mobile switching center (MSC) 1446, a serving GPRS support node (SGSN) 1448, and/or a gateway GPRS support node (GGSN) 1450. While each of the foregoing elements are depicted as part of the core network 1406, it will be appreciated that any one of these elements may be owned and/or operated by an entity other than the core network operator.

The RNC 1442a in the RAN 1403 may be connected to the MSC 1446 in the core network 1406 via an IuCS interface. The MSC 1446 may be connected to the MGW 1444. The MSC 1446 and the MGW 1444 may provide the WTRUs 1402a, 1402b, 1402c with access to circuit-switched networks, such as the PSTN 1408, to facilitate communications between the WTRUs 1402a, 1402b, 1402c and traditional land-line communications devices.

The RNC 1442a in the RAN 1403 may also be connected to the SGSN 1448 in the core network 1406 via an IuPS interface. The SGSN 1448 may be connected to the GGSN 1450. The SGSN 1448 and the GGSN 1450 may provide the WTRUs 1402a, 1402b, 1402c with access to packet-switched networks, such as the Internet 1410, to facilitate communications between and the WTRUs 1402a, 1402b, 1402c and IP-enabled devices.

As noted above, the core network 1406 may also be connected to the networks 1412, which may include other wired or wireless networks that are owned and/or operated by other service providers.

Figure 14D:
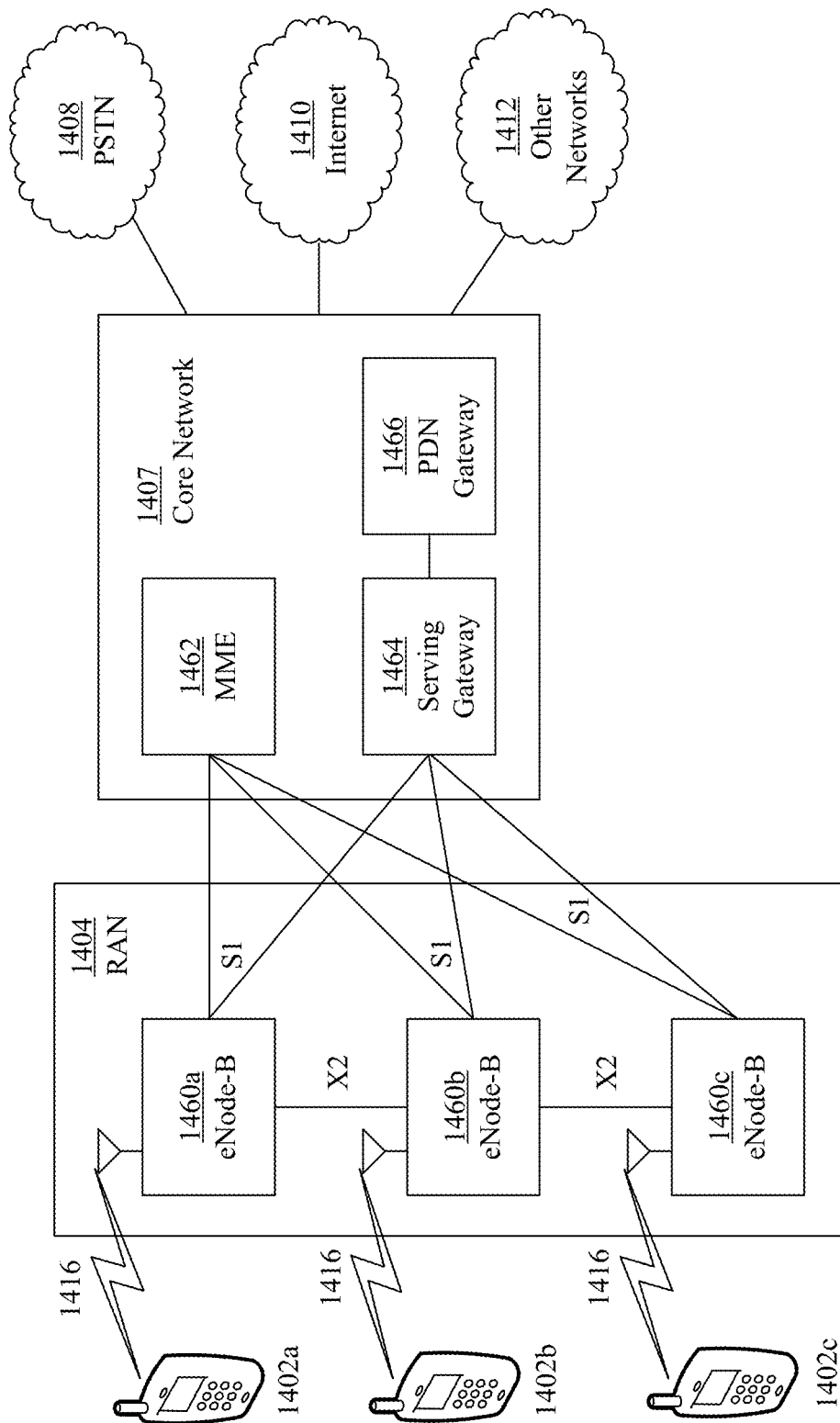
FIG. 14D is a system diagram of another example radio access network and another example core network that may be used within the communications system illustrated in FIG. 14A.

FIG. 14D is a system diagram of the RAN 1404 and the core network 1407 according to an embodiment. As noted above, the RAN 1404 may employ an E-UTRA radio technology to communicate with the WTRUs 1402a, 1402b, 1402c over the air interface 1416. The RAN 1404 may also be in communication with the core network 1407.

The RAN 1404 may include eNode-Bs 1460a, 1460b, 1460c, though it will be appreciated that the RAN 1404 may include any number of eNode-Bs while remaining consistent with an embodiment. The eNode-Bs 1460a, 1460b, 1460c may each include one or more transceivers for communicating with the WTRUs 1402a, 1402b, 1402c over the air interface 1416. In one embodiment, the eNode-Bs 1460a, 1460b, 1460c may implement MIMO technology. Thus, the eNode-B 1460a, for example, may use multiple antennas to transmit wireless signals to, and receive wireless signals from, the WTRU 1402a.

Each of the eNode-Bs 1460a, 1460b, 1460c may be associated with a particular cell (not shown) and may be configured to handle radio resource management decisions, handover decisions, scheduling of users in the uplink and/or downlink, and the like. As shown in FIG. 14D, the eNode-Bs 1460a, 1460b, 1460c may communicate with one another over an X2 interface.

The core network 1407 shown in FIG. 14D may include a mobility management gateway (MME) 1462, a serving gateway 1464, and a packet data network (PDN) gateway 1466. While each of the foregoing elements are depicted as part of the core network 1407, it will be appreciated that any one of these elements may be owned and/or operated by an entity other than the core network operator.

The MME 1462 may be connected to each of the eNode-Bs 1460a, 1460b, 1460c in the RAN 1404 via an S1 interface and may serve as a control node. For example, the MME 1462 may be responsible for authenticating users of the WTRUs 1402a, 1402b, 1402c, bearer activation/deactivation, selecting a particular serving gateway during an initial attach of the WTRUs 1402a, 1402b, 1402c, and the like. The MME 1462 may also provide a control plane function for switching between the RAN 1404 and other RANs (not shown) that employ other radio technologies, such as GSM or WCDMA.

The serving gateway 1464 may be connected to each of the eNode-Bs 1460a, 1460b, 1460c in the RAN 1404 via the S1 interface. The serving gateway 1464 may generally route and forward user data packets to/from the WTRUs 1402a, 1402b, 1402c. The serving gateway 1464 may also perform other functions, such as anchoring user planes during inter-eNode B handovers, triggering paging when downlink data is available for the WTRUs 1402a, 1402b, 1402c, managing and storing contexts of the WTRUs 1402a, 1402b, 1402c, and the like.

The serving gateway 1464 may also be connected to the PDN gateway 1466, which may provide the WTRUs 1402a, 1402b, 1402c with access to packet-switched networks, such as the Internet 1410, to facilitate communications between the WTRUs 1402a, 1402b, 1402c and IP-enabled devices.

The core network 1407 may facilitate communications with other networks. For example, the core network 1407 may provide the WTRUs 1402a, 1402b, 1402c with access to circuit-switched networks, such as the PSTN 1408, to facilitate communications between the WTRUs 1402a, 1402b, 1402c and traditional land-line communications devices. For example, the core network 1407 may include, or may communicate with, an IP gateway (e.g., an IP multimedia subsystem (IMS) server) that serves as an interface between the core network 1407 and the PSTN 1408. In addition, the core network 1407 may provide the WTRUs 1402a, 1402b, 1402c with access to the networks 1412, which may include other wired or wireless networks that are owned and/or operated by other service providers.

Figure 14E:
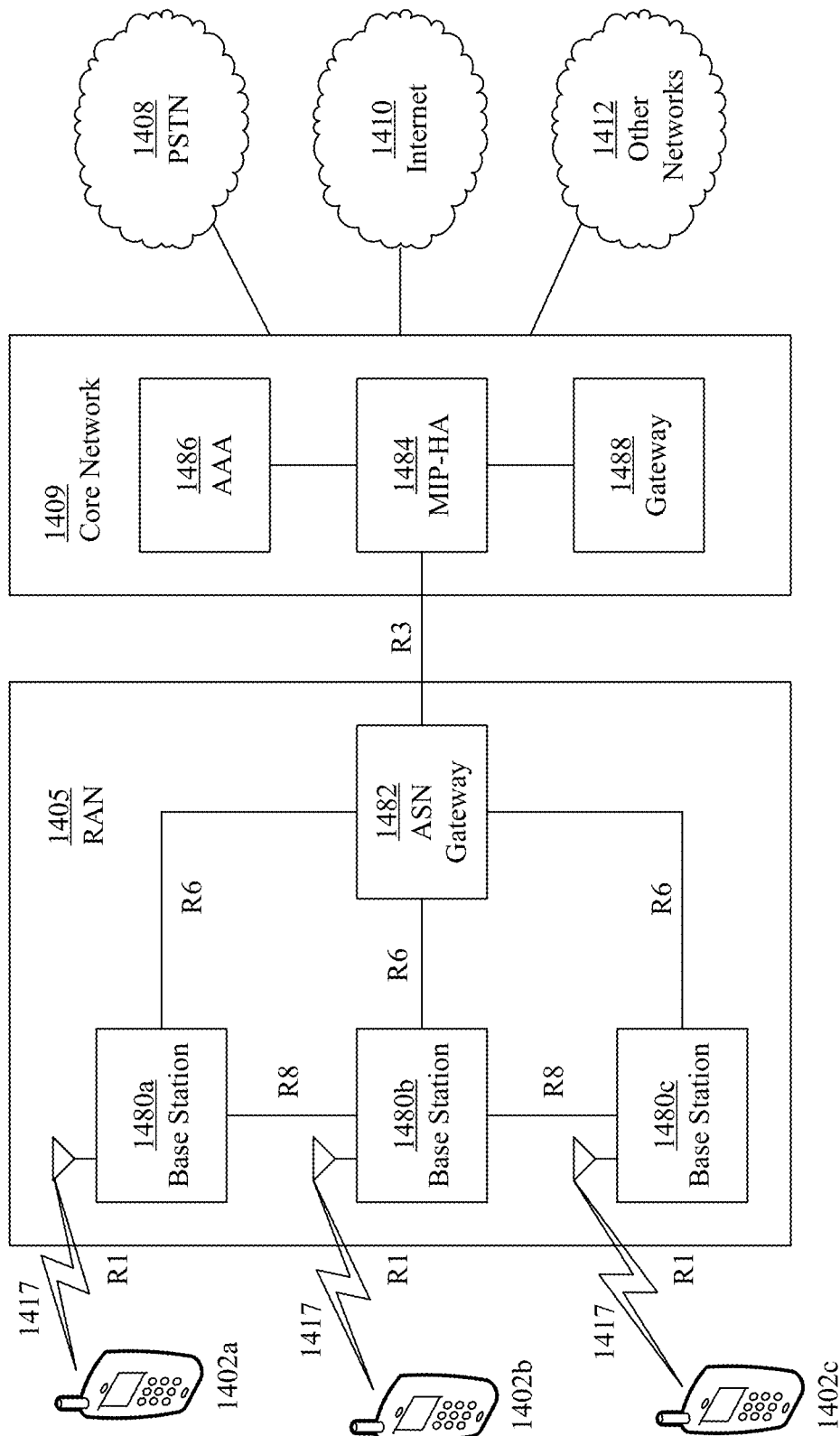
FIG. 14E is a system diagram of another example radio access network and another example core network that may be used within the communications system illustrated in FIG. 14A.

FIG. 14E is a system diagram of the RAN 1405 and the core network 1409 according to an embodiment. The RAN 1405 may be an access service network (ASN) that employs IEEE 802.16 radio technology to communicate with the WTRUs 1402a, 1402b, 1402c over the air interface 1417. As will be further discussed below, the communication links between the different functional entities of the WTRUs 1402a, 1402b, 1402c, the RAN 1405, and the core network 1409 may be defined as reference points.

As shown in FIG. 14E, the RAN 1405 may include base stations 1480a, 1480b, 1480c, and an ASN gateway 1482, though it will be appreciated that the RAN 1405 may include any number of base stations and ASN gateways while remaining consistent with an embodiment. The base stations 1480a, 1480b, 1480c may each be associated with a particular cell (not shown) in the RAN 1405 and may each include one or more transceivers for communicating with the WTRUs 1402a, 1402b, 1402c over the air interface 1417. In one embodiment, the base stations 1480a, 1480b, 1480c may implement MIMO technology. Thus, the base station 1480a, for example, may use multiple antennas to transmit wireless signals to, and receive wireless signals from, the WTRU 1402a. The base stations 1480a, 1480b, 1480c may also provide mobility management functions, such as handoff triggering, tunnel establishment, radio resource management, traffic classification, quality of service (QoS) policy enforcement, and the like. The ASN gateway 1482 may serve as a traffic aggregation point and may be responsible for paging, caching of subscriber profiles, routing to the core network 1409, and the like.

The air interface 1417 between the WTRUs 1402a, 1402b, 1402c and the RAN 1405 may be defined as an R1 reference point that implements the IEEE 802.16 specification. In addition, each of the WTRUs 1402a, 1402b, 1402c may establish a logical interface (not shown) with the core network 1409. The logical interface between the WTRUs 1402a, 1402b, 1402c and the core network 1409 may be defined as an R2 reference point, which may be used for authentication, authorization, IP host configuration management, and/or mobility management.

The communication link between each of the base stations 1480a, 1480b, 1480c may be defined as an R8 reference point that includes protocols for facilitating WTRU handovers and the transfer of data between base stations. The communication link between the base stations 1480a, 1480b, 1480c and the ASN gateway 1482 may be defined as an R6 reference point. The R6 reference point may include protocols for facilitating mobility management based on mobility events associated with each of the WTRUs 1402a, 1402b, 1402c.

As shown in FIG. 14E, the RAN 1405 may be connected to the core network 1409. The communication link between the RAN 1405 and the core network 1409 may defined as an R3 reference point that includes protocols for facilitating data transfer and mobility management capabilities, for example. The core network 1409 may include a mobile IP home agent (MIP-HA) 1484, an authentication, authorization, accounting (AAA) server 1486, and a gateway 1488. While each of the foregoing elements are depicted as part of the core network 1409, it will be appreciated that any one of these elements may be owned and/or operated by an entity other than the core network operator.

The MIP-HA may be responsible for IP address management, and may enable the WTRUs 1402a, 1402b, 1402c to roam between different ASNs and/or different core networks. The MIP-HA 1484 may provide the WTRUs 1402a, 1402b, 1402c with access to packet-switched networks, such as the Internet 1410, to facilitate communications between the WTRUs 1402a, 1402b, 1402c and IP-enabled devices. The AAA server 1486 may be responsible for user authentication and for supporting user services. The gateway 1488 may facilitate interworking with other networks. For example, the gateway 1488 may provide the WTRUs 1402a, 1402b, 1402c with access to circuit-switched networks, such as the PSTN 1408, to facilitate communications between the WTRUs 1402a, 1402b, 1402c and traditional land-line communications devices. In addition, the gateway 1488 may provide the WTRUs 1402a, 1402b, 1402c with access to the networks 1412, which may include other wired or wireless networks that are owned and/or operated by other service providers.

Although not shown in FIG. 14E, it will be appreciated that the RAN 1405 may be connected to other ASNs and the core network 1409 may be connected to other core networks. The communication link between the RAN 1405 the other ASNs may be defined as an R4 reference point, which may include protocols for coordinating the mobility of the WTRUs 1402a, 1402b, 1402c between the RAN 1405 and the other ASNs. The communication link between the core network 1409 and the other core networks may be defined as an R5 reference, which may include protocols for facilitating interworking between home core networks and visited core networks.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed:

1. A method for palette coding video data, the method comprising:
producing a palette table comprising a plurality of color indices corresponding to respective colors of a plurality of major colors;
creating a palette index map that maps a pixel of the video data to a color index in the palette table if a color of the pixel is associated with a major color, and maps the pixel of the video data to an escape color index if the color of the pixel is not associated with a major color; and
generating palette index prediction data based on the palette index map, the palette index prediction data comprising run value data that associates run values with index values for at least a portion of the palette index map, at least one run value of the run value data being associated with the escape color index.

2. The method of claim 1, wherein the escape color index is greater than a maximum color index of the plurality of color indices of the palette table.

3. The method of claim 1, wherein the escape color index corresponds to a size of the palette table.

4. The method of claim 1, the at least one run value indicating a number of consecutive pixels to be encoded in a run mode, at least one pixel of the consecutive pixels being coded using the escape color index.

5. The method of claim 1, the at least one run value indicating a number of consecutive pixels to be encoded in a copy mode, at least one pixel of the consecutive pixels being coded using the escape color index.

6. The method of claim 1, wherein the at least one run value indicates a number of consecutive pixels, wherein at least one pixel of the consecutive pixels is coded using the escape color index, and wherein escape color values are coded for each of the at least one pixel of the consecutive pixels.

7. The method of claim 1, further comprising sending the palette table and the palette index prediction data toward a decoder.

8. A video coding device for palette coding video data, the video coding device comprising a processor to:
produce a palette table comprising a plurality of color indices corresponding to respective colors of a plurality of major colors;
create a palette index map that maps a pixel of the video data to a color index in the palette table if a color of the pixel is associated with a major color, and maps the pixel of the video data to an escape color index if the color of the pixel is not associated with a major color; and
generate palette index prediction data based on the palette index map, the palette index prediction data comprising run value data that associates run values with index values for at least a portion of the palette index map, at least one run value of the run value data being associated with the escape color index.

9. The video coding device of claim 8, wherein the escape color index is greater than a maximum color index of the plurality of color indices of the palette table.

10. The video coding device of claim 8, wherein the escape color index corresponds to a size of the palette table.

11. The video coding device of claim 8, the at least one run value indicating a number of consecutive pixels to be encoded in a run mode, at least one pixel of the consecutive pixels being coded using the escape color index.

12. The video coding device of claim 8, the at least one run value indicating a number of consecutive pixels to be encoded in a copy mode, at least one pixel of the consecutive pixels being coded using the escape color index.

13. The video coding device of claim 8, wherein the at least one run value indicates a number of consecutive pixels, wherein at least one pixel of the consecutive pixels is coded using the escape color index, and wherein escape color values are coded for each of the at least one pixel of the consecutive pixels.

14. The video coding device of claim 8, wherein the processor sends the palette table and the palette index prediction data toward a decoder.

15. A method for palette decoding video data, the method comprising:
receiving a palette table comprising a plurality of color indices corresponding to respective colors of a plurality of colors;
receiving palette index map parameters, the palette index map parameters representing a series of color indices that comprises an escape color index mapping one or more pixels of a coding unit to an escape color mode;
determining, based on the palette index map parameters, the one or more pixels of the coding unit that are mapped by a palette index map to the escape color mode;
receiving escape color parameters that indicate at least one escape color value for the one or more pixels of the coding unit mapped to the escape color mode after receiving the palette index map parameters for the coding unit; and
reconstructing the coding unit based on the received palette index map parameters and the received escape color parameters.

16. The method of claim 15, wherein the series of color indices comprises a color index mapping one or more pixels of the coding unit to a major color of the palette table.

17. The method of claim 15, wherein colors for the one or more pixels of the coding unit that are mapped by the palette index map to the escape color mode are reconstructed based on the received escape color parameters.

18. A video decoding device for palette decoding video data, the video decoding device comprising a processor to:
receive a palette table comprising a plurality of color indices corresponding to respective colors of a plurality of colors;
receive palette index map parameters, the palette index map parameters representing a series of color indices that comprises an escape color index mapping one or more pixels of a coding unit to an escape color mode;
determine, based on the palette index map parameters, the one or more pixels of the coding unit that are mapped by a palette index map to the escape color mode;
receive escape color parameters that indicate at least one escape color value for the one or more pixels of the coding unit mapped to the escape color mode after receiving the palette index map parameters for the coding unit; and
reconstruct the coding unit based on the received palette index map parameters and the received escape color parameters.

19. The video decoding device of claim 18, wherein colors for the one or more pixels of the coding unit that are mapped by the palette index map to the escape color mode are reconstructed based on the received escape color parameters.

20. A method for palette coding video data, the method comprising:
producing a palette table comprising a plurality of color indices corresponding to respective colors of a plurality of colors;
creating a palette index map for a coding unit, the palette index map comprising a series of color indices, each of the color indices of the series being taken from at least one of the plurality of indices in the palette table or an escape color index indicative of an escape color mode, the series of color indices selectively mapping pixels of the coding unit to major colors or to the escape color mode;

including the palette table in a video bitstream;
including, in the video bitstream, palette index map parameters representing the series of color indices of the palette index map for the coding unit; and
including, in the video bitstream, escape color parameters indicating escape color values for pixels of the coding unit mapped to the escape color mode after the palette index map parameters.

* * * * *